United States Patent
Berggren et al.

(10) Patent No.: US 8,275,381 B2
(45) Date of Patent: Sep. 25, 2012

(54) METHOD, APPARATUS AND SYSTEM FOR SIGNALING RESOURCE PARTITION

(75) Inventors: Fredrik Berggren, Upplands Väsby (SE); Brian Classon, Illinois, IL (US); Johan Johansson, Lillsjobacken (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/175,529

(22) Filed: Jul. 1, 2011

(65) Prior Publication Data
US 2011/0269475 A1 Nov. 3, 2011

Related U.S. Application Data

(63) Continuation of application No. PCT/CN2010/070009, filed on Jan. 4, 2010.

(30) Foreign Application Priority Data
Jan. 4, 2009 (WO) ................ PCT/CN2009/070010

(51) Int. Cl.
*H04W 88/02* (2009.01)

(52) U.S. Cl. ..................................... 455/450; 455/452.1

(58) Field of Classification Search .................. 455/450, 455/452.1
See application file for complete search history.

(56) References Cited

U.S. PATENT DOCUMENTS

| | | | |
|---|---|---|---|
| 2007/0242636 A1 | 10/2007 | Kashima et al. | |
| 2009/0199172 A1* | 8/2009 | Zhong et al. | 717/168 |
| 2010/0227569 A1* | 9/2010 | Bala et al. | 455/73 |

FOREIGN PATENT DOCUMENTS

| | | |
|---|---|---|
| CN | 101127719 A | 2/2008 |
| EP | 1 855 421 A1 | 11/2007 |
| JP | 2007282021 A | 10/2007 |
| WO | WO 2008/054157 A2 | 5/2008 |
| WO | WO 2008/081313 A2 | 7/2008 |
| WO | WO 2008/135820 A2 | 11/2008 |

OTHER PUBLICATIONS

Written Opinion of the International Searching Authority issued in corresponding PCT Patent Application No. PCT/CN2009/070010, mailed Sep. 17, 2009.
International Search Report issued in corresponding PCT Patent Application No. PCT/CN2009/070010, mailed Sep. 17, 2009.
Written Opinion of the International Searching Authority issued in corresponding PCT Patent Application No. PCT/CN2010/070009, mailed Apr. 15, 2010.
International Search Report issued in corresponding PCT Patent Application No. PCT/CN2010/070009, mailed Apr. 15, 2010.
3rd Generation Partnership Project "Technical Specification Group Radio Access Network; Further Advancements for E-UTRA Physical Layer Aspects" (Release X). 3GPP TR 36.814, V0.2.0, Sep. 2008.

* cited by examiner

*Primary Examiner* — Diane Mizrahi
(74) *Attorney, Agent, or Firm* — Brinks Hofer Gilson & Lione

(57) ABSTRACT

Signaling resource partition of a component carrier in a wireless communication system is disclosed. The number of primary resource blocks and the number of extension resource blocks of the component carrier is encoded and signaled to a UE, so the UE can obtain the resource partition of the component carrier.

18 Claims, 10 Drawing Sheets

METHOD, APPARATUS AND SYSTEM FOR SIGNALING RESOURCE PARTITION

CROSS-REFERENCE TO RELATED APPLICATIONS

This application is a continuation of International Application No. PCT/CN2010/070009, filed on Jan. 4, 2010, which claims priority to International Application No. PCT/CN2009/070010, filed on Jan. 4, 2009, both of which are hereby incorporated by reference in their entireties.

FIELD

The present disclosure relates to a field of wireless communication, especially it relates to a method, apparatus and system for signaling resource partition.

BACKGROUND

When constructing new digital radio communication systems, there is a need for increasing data rates in the system in relation to data rates of preceding radio communication systems to satisfy service demand. New services are continuously provided, which require higher data rates. To support higher data rates, e.g., Long Term Evolution Advanced (LTE-Advanced) is being developed. Also, in order not to force users of the preceding radio communication system to buy new equipment, such as user equipment devices (UEs), every time a new radio communication system or an updated version of an old system is launched, backwards compatibility should preferably be assured in the new or updated radio communication system. This gradual change of equipment requirements also gives the users some time to exchange their equipment.

In this document, the embodiments of the disclosure will be exemplified for the LTE-Advanced system, and thus for Advanced E-UTRA. However, the embodiments of the disclosure are applicable to essentially any system utilizing multicarrier transmission, such as Orthogonal Frequency Division Multiplexing (OFDM) transmission, as is clear for a skilled person. The term LTE is generally used for denoting Evolved Universal Terrestrial Radio Access/Evolved Universal Terrestrial Radio Access Network (E-UTRA/E-UTRAN). Correspondingly, the term LTE-Advanced is in this document used for denoting Advanced E-UTRA/Advanced E-UTRAN, and eNodeB denoting a base station of such system.

For the LTE/LTE-Advanced case, backwards compatibility means that a LTE User Equipment (UE) should be able to work in the LTE-Advanced system. Correspondingly, here, and throughout this document, "backwards compatible" (or simply "compatible") means that equipment of a legacy system (i.e. an older system) should be able to work in the new system being defined.

SUMMARY

In e.g. LTE, time-frequency resources of a carrier are divided into resource blocks (RBs), which represent orthogonal resources to be used for transmission. In example LTE, transmission/reception is performed over one carrier at a time, i.e., a single component carrier. For higher data rates and backwards compatibility, it is carrier aggregation may be advantageous in an example development, LTE-Advanced, utilizing simultaneous transmission/reception over multiple so called component carriers. A component carrier structure may include RBs of a legacy system, such as LTE in relation to LTE-Advanced, referred to as primary RBs and RBs of a new or more developed system, such as LTE-Advanced, referred to as extension RBs. So for the LTE example, there would be dedicated LTE-Advanced RBs and LTE RBs. The component carrier structure could, e.g., be achieved by partitioning the frequency domain through Frequency Domain Multiplexing (FDM), and multiplexing LTE and LTE-Advanced transmissions to different parts of the component carrier bandwidth. The component carrier thus supports a primary transmission scheme (e.g. LTE) as well as another secondary transmission scheme (e.g. LTE-Advanced). The allocation of number of primary RBs and the number of extension RBs may be considered a resource partitioning of the component carrier. To communicate the resource partition of the component carrier to user equipment, UE, may be a problem as such.

A related problem is associated with encoding of the number of extension RBs of the component carrier.

A further problem pertains to signaling of the encoded number of extension RBs of the component carrier.

Also, a problem is related to signaling of multiple encoded numbers of extension RBs of multiple component carriers.

Further, a problem is how to signal the encoded number of primary RBs of the component carrier when the component carrier only comprises extension RBs.

A further problem refers to operations when the extension RBs of the component carrier are located asymmetrically around the primary RBs.

With the purpose of solving one or more of the above indicated problems, and from the standpoint of the above indicated field of disclosure, this specification includes a number of embodiments or modes of exercising the disclosure.

One example embodiment of the present disclosure provides a method for signaling resource partition of at least one component carrier in a wireless communication system, wherein the component carrier comprises primary RBs and/or extension RBs.

In a further example embodiment, the encoding the number of extension RBs of a first component carrier includes: encoding the number of extension RBs with an encoding method being independent of the number of primary RBs of the first component carrier.

In a further development, the encoding the number of extension RBs of the first component carrier includes: encoding the number of extension RBs and the number of primary RBs of the first component carrier with a joint encoding method.

To avoid any risk of misunderstanding, the abovementioned further embodiment does not exclude example embodiments, wherein the encoding the number of extension RBs of the first component carrier includes encoding the number of extension RBs with an encoding method being dependent on the number of primary RBs of the first component carrier.

Furthermore, example signaling of the encoded number of extension RBs includes: signaling the encoded number of extension RBs through the first component carrier or a second component carrier.

According to a further aspect of the disclosure, signaling of the encoded number of extension RBs preferably includes: signaling the encoded number of extension RBs through at least one primary RB of a component carrier.

Furthermore, the signaling the encoded number of extension RBs through at least one primary RB of a component carrier preferably includes: signaling the encoded number of extension RBs through spare values or spare bits in an existing master information block (MIB) or through a new MIB, in the primary RBs of a component carrier.

According to one example embodiment of the disclosure, the signaling the en-coded number of extension RBs through at least one primary RB of a component carrier includes: signaling the encoded number of extension RBs through new fields in at least one existing system information block (SIB) or through at least one new SIB in the primary RBs of a component carrier.

According to one option, the signaling the encoded number of extension RBs includes signaling the encoded number of extension RBs through at least one extension RB of a component carrier.

Also according to an option, the signaling the encoded number of extension RBs includes signaling the encoded number of extension RBs through at least one subcarrier located between two component carriers.

According to a further option, the signaling the encoded number of extension RBs includes: signaling the encoded number of extension RBs of the first component carrier and encoded number of extension RBs of a third component carrier through the same component carrier.

Finally, according to an additional option the signaling the encoded number of extension RBs includes signaling the encoded number of extension RBs of the first component carrier and encoded number of extension RBs of a third component carrier through the same at least one subcarrier located between two component carriers.

In one example realization, the first component carrier only includes extension RBs, and where the number of primary RBs of the component carrier is 0.

According to an example further mode of the disclosure, the signaling the encoded number of primary RBs through at least one primary RB of a component carrier preferably includes signaling the encoded number of primary RBs through spare values in an existing MIB of a component carrier.

Further according to an aspect of the disclosure, if the extension RBs of the first component carrier are located asymmetrically around the primary RBs of the first component carrier, the method preferably includes encoding additional information on the location of the extension RBs of the first component carrier; and signaling the encoded additional information on the location of the extension RBs; or if the extension RBs of the first component carrier are located asymmetrically around the primary RBs of the first component carrier, the method further includes using predefined rules to determine the location of the extension RBs of the first component carrier.

Also, according to an aspect of the disclosure the number of extension RBs is indirectly represented by the total number of RBs of the first component carrier or directly represented by the actual number of extension RBs of the first component carrier.

One embodiment of the present disclosure provides a method for receiving resource partition of at least one component carrier in a wireless communication system, wherein the component carrier comprises primary RBs and/or extension RBs. The method includes: receiving an encoded number of primary RBs of a component carrier; receiving an encoded number of extension RBs of the component carrier; decoding the encoded number of primary RBs to obtain the number of primary RBs of the component carrier; and decoding the encoded number of extension RBs according to a representation comprising the number of extension RBs for any supported number of primary RBs to obtain the number of extension RBs of the component carrier.

Furthermore, the decoding the encoded number of extension RBs includes: decoding the encoded number of extension RBs dependently on the number of primary RBs of the component carrier to obtain the number of extension RBs of the component carrier.

Furthermore, the number of extension RBs is indirectly represented by the total number of RBs of the component carrier or directly represented by the actual number of extension RBs of the component carrier.

One embodiment of the present disclosure provides a data structure which comprises resource partition information of a component carrier in a wireless communication system, wherein the component carrier comprises primary RBs and/or extension RBs. The data structure includes at least one entity which indicates an available number of extension RBs of the component carrier for a supported number of primary RBs.

In a development, the entity is encoded independently of the number of primary RBs of the component carrier.

In a further development, the entity indicates one available combination of the number of primary RBs and the number of extension RBs, wherein the entity is encoded jointly with the number of primary RBs of the component carrier.

The aforementioned does not exclude from embodiments of the disclosure that the entity indicates one available combination of the number of primary RBs and the number of extension RBs, wherein the entity is encoded dependently on the number of primary RBs of the component carrier.

One embodiment of the present disclosure provides an apparatus for signaling resource partition of at least one component carrier in a wireless communication system, wherein the component carrier comprises primary RBs and/or extension RBs. The apparatus includes: a primary encoding module, configured to encode the number of primary RBs of a component carrier; an extension encoding module, configured to encode number of extension RBs of the component carrier according to a representation comprising the number of extension RBs for any supported number of primary RBs, wherein the encoded number of extension RBs identifies for the number of primary RBs the available number of extension RBs; a primary signaling module, configured to signal the encoded number of primary RBs through at least one primary RB of the component carrier; and an extension signaling module, configured to signal the encoded number of extension RBs.

In a development, the extension encoding module includes a first encoding module, configured to encode the number of extension RBs with an encoding method being independent of the number of primary RBs of the component carrier according to a representation comprising the number of extension RBs for any supported number of primary RBs.

In a further development, the extension encoding module includes: a second encoding module, configured to encode the number of extension RBs and the number of primary RBs of the component carrier with a joint encoding method according to a representation comprising the number of extension RBs for any supported number of primary RBs.

The abovementioned does not exclude that the extension encoding module includes a third encoding module, configured to encode the number of extension RBs with an encoding method being dependent on the number of primary RBs of the component carrier according to a representation comprising the number of extension RBs for any supported number of primary RBs.

Further, the extension signaling module preferably includes a first signaling module, configured to signal the encoded number of extension RBs through at least one primary RB of a component carrier.

According to one aspect of the disclosure, the extension signaling module includes a second signaling module, configured to signal the encoded number of extension RBs through at least one extension RB of a component carrier.

In a further aspect, the extension signaling module includes a third signaling module configured to signal the encoded number of extension RBs through at least one subcarrier located between two component carriers.

In one sample embodiment, the number of extension RBs is indirectly represented by the total number of RBs of the component carrier or directly represented by the actual number of extension RBs of the component carrier.

One embodiment of the present disclosure provides user equipment (UE) for receiving resource partition of at least one component carrier in a wireless communication system, wherein the component carrier comprises primary RBs and/or extension RBs. The UE includes: a primary receiving module, configured to receive an encoded number of primary RBs of a component carrier; an extension receiving module, configured to receive an encoded number of extension RBs of the component carrier; a primary decoding module, configured to decode the encoded number of primary RBs to obtain the number of primary RBs of the component carrier; and an extension decoding module, configured to decode the encoded number of extension RBs according to a representation comprising the number of extension RBs for any supported number of primary RBs to obtain the number of extension RBs of the component carrier.

According to a development, the extension decoding module includes a first decoding module, configured to decode the encoded number of extension RBs dependently on the number of primary RBs of the component carrier according to a representation comprising the number of extension RBs for any supported number of primary RBs to obtain the number of extension RBs of the component carrier.

According to a further development, the number of extension RBs is indirectly represented by the total number of RBs of the component carrier or directly represented by the actual number of extension RBs of the component carrier.

One embodiment of the present disclosure provides a system for signaling resource partition of at least one component carrier in a wireless communication system, wherein the component carrier comprises primary RBs and/or extension RBs. The system includes: a base station, configured to encode the number of primary RBs of a component carrier; encode the number of extension RBs of the component carrier according to a representation comprising the number of extension RBs for any supported number of primary RBs, wherein the encoded number of extension RBs identifies for the number of primary RBs the available number of extension RBs; signal the encoded number of primary RBs through at least one primary RB of the component carrier; and signaling the encoded number of extension RBs; and a user equipment (UE), configured to receive the encoded number of primary RBs of the component carrier; receive the encoded number of extension RBs of the component carrier; decode the encoded number of primary RBs to get the number of primary RBs of the component carrier; and decode the encoded number of extension RBs according to a representation comprising the number of extension RBs for any supported number of primary RBs to get the number of extension RBs of the component carrier.

One embodiment of the present disclosure provides a computer program product including computer program code. The computer program code, when executed, enables a computer or processing circuitry to perform the steps of the above methods for signaling resource partition of at least one component carrier in a wireless communication system.

One embodiment of the present disclosure provides a computer readable medium, wherein the above computer program code is carried by the computer readable medium.

One embodiment of the present disclosure provides a computer program product comprising computer program code. The computer program code, when executed, enables a computer or processing circuitry to perform the steps of the above methods for receiving resource partition of at least one component carrier in a wireless communication system.

One embodiment of the present disclosure provides a computer readable medium, wherein the above computer program code is carried by the computer readable medium.

The advantages of a method, apparatus and system according to some embodiments of the present disclosure are that it can communicate a resource partition of a component carrier to a UE.

A further advantage according to an embodiment of the present disclosure is that the number of extension RBs of the component carrier can be encoded according to a representation comprising the number of extension RBs for any supported number of primary RBs.

A further advantage according to an embodiment of the present disclosure is that the encoded number of extension RBs of the component carrier can be signaled through a component carrier or subcarriers.

A further advantage according to an embodiment of the present disclosure is that multiple encoded numbers of extension RBs of multiple component carriers can be signaled through the same component carrier or subcarriers.

A further advantage according to an embodiment of the present disclosure is that when the component carrier only comprises extension RBs the encoded number of primary RBs of the component carrier can be signaled through spare values or spare bits in an existing master information block (MIB) of a component carrier.

A further advantage according to an embodiment of the present disclosure is that when the extension RBs of the component carrier are located asymmetrically around the primary RBs, the UE can obtain the location of the extension RBs via additional information or predefined rules.

BRIEF DESCRIPTION OF THE DRAWINGS

Some methods, apparatuses, and a system according to the present disclosure will now be described in detail with reference to the accompanying drawings, in which.

DETAILED DESCRIPTION

Figure 1:
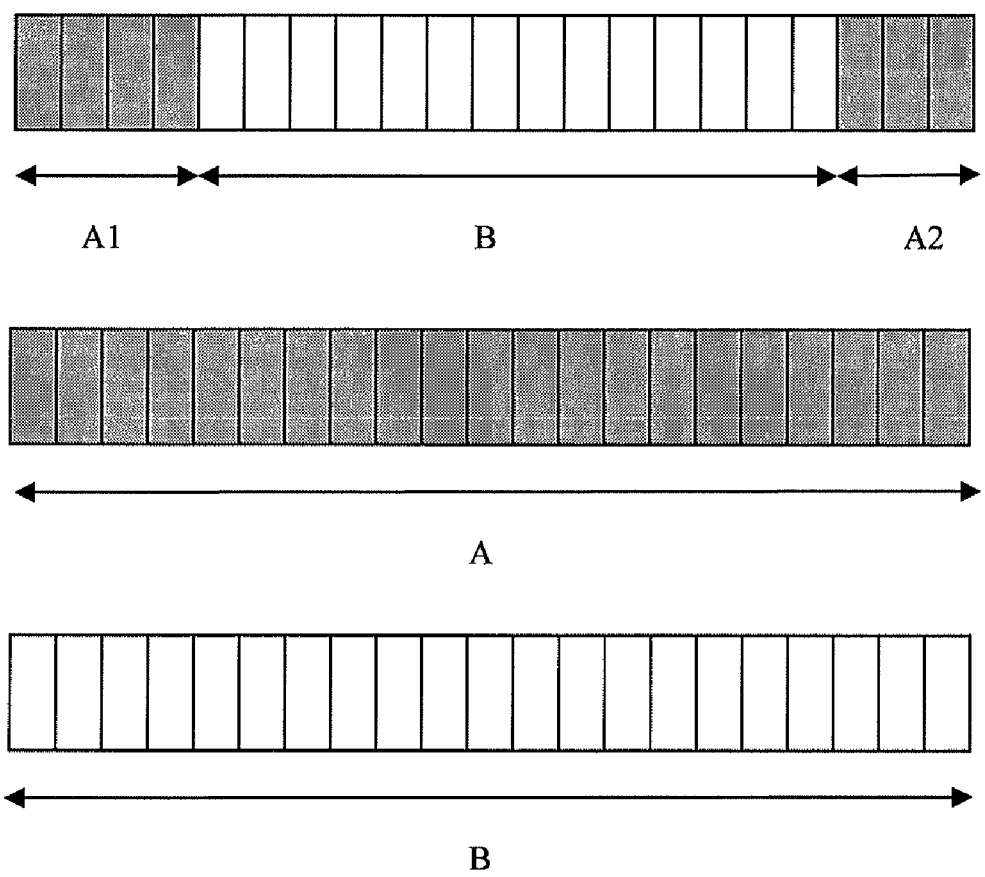
FIG. 1 illustrates some examples of a component carrier structure according to the embodiment of the present disclosure.

FIG. 1 illustrates some examples of a component carrier structure. The top of FIG. 1 depicts a component carrier structure where the RBs within bandwidths A1 and A2 (containing extension RBs) are only received by LTE-Advanced UEs, while the RBs within bandwidth B (containing primary RBs) can be received by both LTE UEs and LTE-Advanced UEs. Extension RBs may not be received by LTE UEs, since either the component carrier bandwidth does not commensurate with those defined for LTE, or since the channel structures on the extension RBs are different from those of LTE. With such a component carrier structure, LTE-Advanced UEs can access the carrier as any LTE UE through the central part B, facilitating backwards compatibility. The extension RBs of the component carrier may be located asymmetrically around the primary RBs as shown in the top of FIG. 1 or located symmetrically around the primary RBs. At a later stage, most UEs may be capable of LTE-Advanced support, so the RBs within bandwidth B could be reduced and there may even be component carriers not having a LTE part (part B in FIG. 1), i.e., the bandwidth B=0, which is depicted in the middle of FIG. 1. The other extreme case, where there are no LTE-Advanced resources (A1=A2=0), is showed in the bottom of FIG. 1.

The bandwidths A1 and A2 in FIG. 1 relate to the actual number of extension RBs, while B relates to the number of primary RBs. The number of extension RBs of the component carrier, denoted $N_E$, may be indirectly represented by the total number of RBs of the component carrier, denoted $N_T$, or be directly represented by the actual number of extension RBs of the component carrier, denoted $N_E^{actual}$. It is obvious that the total number of RBs of the component carrier $N_T$ is the sum of the number of primary RBs (denoted $N_P$) and the actual number of extension RBs, i.e. $N_T = N_P + N_E^{actual}$. So if any two of the three values are known, the remaining value can be determined and then the resource partition of the component carrier can be found.

In some embodiments of the disclosure, the number of extension RBs of the component carrier $N_E$ is indirectly represented by the total number of RBs of the component carrier $N_T$. Of course, the actual number of extension RBs of the component carrier $N_E^{actual}$ can be used to represent the number of extension RBs. It is straightforward to produce a table (representation) directly using $N_E^{actual}$ and the procedure is the same as the method when $N_T$ is used, since $N_P$ can be assumed known to an LTE-Advanced UE due to backwards compatibility.

In order to give an understanding of the present disclosure it is first described how the number of primary RBs is communicated in the LTE system.

For establishing a connection to a cell in LTE, a UE first detects and synchronizes to the cell by receiving the synchronization signals, and then acquires the system information needed for operating within a cell. This system information is divided into several parts, depending on its priority, and is transmitted with different type of periodicity. One of the crucial parts of the information is the downlink system bandwidth, i.e., the total number of available RBs of the component carrier. The downlink system bandwidth is included in the so called master information block (MIB) which contains only a small part of the system information and is transmitted with a periodicity of 40 ms on the BCH (Broadcast Channel). The BCH is a transport channel which in turn is mapped to the PBCH (Physical BCH) which is always located in the 6 central RBs of the component carrier. Hence, the UE can receive the PBCH (and thus the MIB) without any prior information of the system bandwidth. The information contained in the MIB makes it possible to receive the channels that occupy the whole component carrier bandwidth, e.g., the control information in the PDCCH (Physical Downlink Control Channel) associated with the PDSCH (Physical Downlink Shared Channel), which contains the scheduled data transmissions.

The main part of the system information, excluding the MIB, is transmitted on other so called system information blocks (SIBs). The SIBs are mapped to different system information messages (SIs), which are transmitted with different periodicities, longer than 40 ms. The SIBs are transmitted on the DL-SCH (Downlink-Shared Channel) transport channel which is mapped to the PDSCH, i.e., they are scheduled through the PDCCH. There are a number of different SIBs, e.g., SIB1 contains information if the UE is allowed to camp on the cell and scheduling information of the other system information, whereas SIB2 contains information needed for the UE to access the cell.

In LTE, there are a number of different transmission bandwidth configurations (i.e., different number of supported RBs) for different channel bandwidths. Table 1 shows the supported configurations of LTE.

TABLE 1

| Channel bandwidth [MHz] | Transmission bandwidth configuration [RBs] |
|---|---|
| 1.4 | 6 |
| 3 | 15 |
| 5 | 25 |
| 10 | 50 |
| 15 | 75 |
| 20 | 100 |

These 6 bandwidth configurations are signaled through 3 bits in the MIB, which is always transmitted in the central 6 RBs of the component carrier. Hence, with these 3 bits, 8 configurations could be encoded and there are thus 2 spare values not being used. It can be noted that there is no configuration for 0 RBs currently defined, i.e., the resource partition depicted in the middle of FIG. 1. In LTE there exists no extension RBs in a component carrier, so the number of primary RBs always equals the total number of RBs of the component carrier and there is thus only one resource partition of the component carrier, which can be obtained by a UE via only knowing the number of the RBs of the component carrier.

An LTE-Advanced UE can due to backwards compatibility receive the LTE part of a component carrier (if such an LTE part exists) and thereby be signaled the LTE downlink bandwidth (referred herein as to primary bandwidth or primary RBs). Thus providing the primary RBs for LTE-Advanced UE is similar to the procedure in LTE. The remaining problem is to provide information to the LTE-Advanced UE about the extension RBs (time-frequency resources) dedicated to LTE-Advanced transmissions.

As multiple component carriers could be aggregated, LTE-Advanced UEs should receive information on the resource partition for each component carrier, respectively.

En example method for signaling resource partition of at least one component carrier briefly includes: encoding the number of primary RBs of a first component carrier; encoding the number of extension RBs of the first component carrier according to a representation comprising the number of extension RBs for any supported number of primary RBs, wherein the encoded number of extension RBs identifies for the number of primary RBs the available number of extension RBs; signaling the encoded number of primary RBs through at least one primary RB of the first component carrier; and signaling the encoded number of extension RBs.

Figure 2:
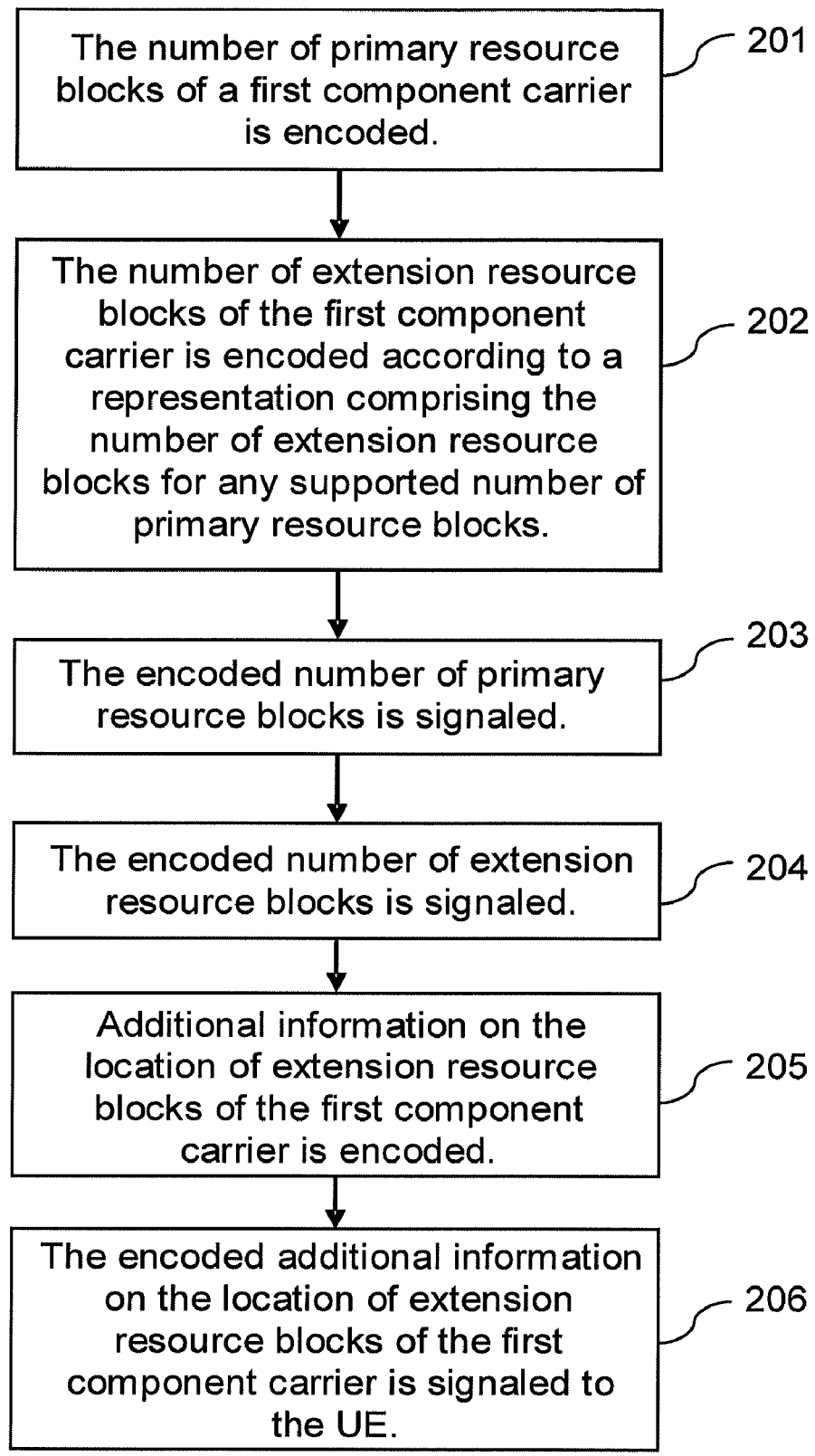
FIG. 2 is a block diagram of one embodiment of the present disclosure.

FIG. 2 illustrates schematically a method for signaling resource partition of at least one component carrier to a UE in a wireless communication system in more detail and comprising various options or alternatives. The method may be performed by a transmitter, base station or eNodeB.

Block 201: The number of primary RBs of a first component carrier is encoded.

The number of primary RBs may be denoted $N_P$. This block is similar to the encoding procedure of the number of RBs of a component carrier in the LTE.

Block 202: The number of extension RBs of the first component carrier is encoded according to a representation comprising the number of extension RBs for any supported number of primary RBs.

The encoded number of extension RBs identifies for the number of primary RBs the available number of extension RBs.

The amount of information that should be signaled depends on how many component carrier bandwidths that may be supported. At least the 6 configurations from LTE should be possible and preferably also wider component carriers may be supported. A component carrier can at most be 110 RBs wide.

Concretely, block 202 may include the following options.

A. The number of extension RBs of the first component carrier is encoded with an encoding method being independent of the number of primary RBs of the first component carrier according to a representation comprising the number of extension RBs for any supported number of primary RBs.

This option is to encode the number of extension RBs separately and independently of the number of primary RBs.

For N supported extension RB configurations of the first component carrier, $\log_2(N)$ bits would be needed. For example, with 3 bits, there can be 8 configurations of $N_E$ of the first component carrier, resulting in that at most two new carrier bandwidths may be introduced in addition to those supported for LTE. Thus 3 new bits and the 3 bits in the MIB would be signaled. Table 2 (a representation) shows an example of this option, where the bandwidth configuration is represented by a 3-bit word. We could also use other representations with other alphabets, orderings or information entities. The entries in Table 2 denote the total number of the RBs of the first component carrier $N_T$, from which one can determine the actual number of extension RBs $N_E^{actual} = N_T - N_P$. It is straightforward to produce a table (representation) directly using $N_E^{actual}$.

TABLE 2

| | Bit configuration | | | | | | | |
|---|---|---|---|---|---|---|---|---|
| $N_P$ | {0, 0, 0} | {0, 0, 1} | {0, 1, 0} | {0, 1, 1} | {1, 0, 0} | {1, 0, 1} | {1, 1, 0} | {1, 1, 1} |
| 6 | N/A | N/A | 100 | 75 | 50 | 25 | 15 | 6 |
| 15 | N/A | N/A | 100 | 75 | 50 | 25 | 15 | N/A |
| 25 | N/A | N/A | 100 | 75 | 50 | 25 | N/A | N/A |
| 50 | N/A | N/A | 100 | 75 | 50 | N/A | N/A | N/A |
| 75 | N/A | N/A | 100 | 75 | N/A | N/A | N/A | N/A |
| 100 | N/A | N/A | 100 | N/A | N/A | N/A | N/A | N/A |

In this example, we can see that this representation includes all the numbers of extension RBs, i.e. all the total number of RBs (6, 15, 25, 50, 75 and 100) for any supported number of primary RBs (0, 6, 15, 25, 50, 75 and 100). The N/A entries denote non-applicable combinations that would not be signaled to a UE. One encoded number of extension RBs {0,1,0} (an entity of the representation) identifies $N_E$=100, always and independently of the value $N_P$. One encoded number of $N_E$ {1,0,1} (another entity of the representation) identifies $N_E$=25, but when the $N_P$ is 50, 75 or 100, the $N_E$ ($N_T$) cannot be 25, so in this situation the number of the extension RBs 25 is not available and will not be encoded to {1,0,1}. For similar reason it should be noted that a row in table 2 for $N_P$=0, if included, would read identically the same as the row for six primary RBs, $N_P$=6, (except for the number in the column of $N_P$).

It is obvious for the skilled person to use different bit configuration to indicate different $N_E$, for example, to use the {0,1,1} to indicate $N_E$=50 instead of 75. If the supported number of bandwidth configurations of the first component carrier is, N=7 or N=8, the spare bit words {0,0,0} and {0,0,1} can be used to indicate the new values for $N_E$.

B. The number of extension RBs and the number of primary RBs of the first component carrier is encoded with a joint encoding method according to a representation comprising the number of extension RBs for any supported number of primary RBs.

This option is to jointly encode the number of extension RBs and the number of primary RBs. That is each supported combination ($N_E$,$N_P$) is encoded. Consider the following example, where it is assumed that the component carriers, including the extension resources, are limited to the number of RBs described by Table 1. Table 3 (another representation) shows the encoding of the supported number of extension RBs by 5-bit words. We could also use other representations with other alphabets, orderings or information entities.

TABLE 3

| N_P | $N_E (N_T)$ 6 | 15 | 25 | 50 | 75 | 100 |
|---|---|---|---|---|---|---|
| 6 | {0, 0, 0, 0, 0} | {0, 0, 0, 0, 1} | {0, 0, 0, 1, 0} | {0, 0, 0, 1, 1} | {0, 0, 1, 0, 0} | {0, 0, 1, 0, 1} |
| 15 | N/A | {0, 0, 1, 1, 0} | {0, 0, 1, 1, 1} | {0, 1, 0, 0, 0} | {0, 1, 0, 0, 1} | {0, 1, 0, 1, 0} |
| 25 | N/A | N/A | {0, 1, 0, 1, 1} | {0, 1, 1, 0, 0} | {0, 1, 1, 0, 1} | {0, 1, 1, 1, 0} |
| 50 | N/A | N/A | N/A | {0, 1, 1, 1, 1} | {1, 0, 0, 0, 0} | {1, 0, 0, 0, 1} |
| 75 | N/A | N/A | N/A | N/A | {1, 0, 0, 1, 0} | {1, 0, 0, 1, 1} |
| 100 | N/A | N/A | N/A | N/A | N/A | {1, 0, 1, 0, 0} |

Thus if $N_P=6$, $N_E$ ($N_T$) could here take on 6 values, but only 1 value if $N_P=100$. Hence there is no use to encode the N/A entries, but only the $$\frac{N(N+1)}{2}$$

eligible combinations. The total number of bits required for such joint encoding is therefore $$\left\lceil \log_2 \frac{N(N+1)}{2} \right\rceil,$$

where with N=6 supported bandwidth configurations of the first component carrier (6, 15, 25, 50, 75 and 100), 5 bits are required. This form of encoding does not make any assumption on that the LTE-Advanced UE already has been signaled the value of $N_P$. This solution may thus be particularly useful if LTE-Advanced UEs may not receive the LTE MIB. Thus the 3 bits for signaling the number of primary RBs are not necessarily utilized and essentially 5 new bits in this example need to be signaled to the LTE-Advanced UE. The entries on the diagonal correspond to the case where there are no dedicated extension RBs, which is depicted in the bottom of FIG. 1.

In this example, we can see that this representation includes all the numbers of extension RBs (6, 15, 25, 50, 75 and 100) for any supported number of primary RBs (6, 15, 25, 50, 75 and 100). Each entity of this representation indicates one available combination of the number of primary RBs and the number of extension RBs. One encoded number of extension RBs {0,0,0,1,0} (an entity of the representation) identifies the available number of extension RBs $N_E=25$ for the number of primary RBs $N_P=6$, i.e. the available combination $(N_E,N_P)=(25,6)$.

It is obvious for the skilled person to use different bit configuration to indicate different combination $(N_E,N_P)$.

C. The number of extension RBs of the first component carrier is encoded with an encoding method being dependent on the number of primary RBs of the first component carrier according to a representation comprising the number of extension RBs for any supported number of primary RBs.

This option is to separately encode the number of primary RBs and the number of extension RBs, but make the encoded number of extension RBs dependent on the number of primary RBs $N_P$. In the example in Table 3, in principle 3 bits would suffice to signal the 6 values of $N_E$ in addition to the 3 bits in the MIB. However, with 3 additional bits (i.e., in total 6 bits) further information could be encoded by making use of the N/A entries in the table. This can be achieved by making the interpretation of the 3 new bits dependent on the encoded number of primary RBs. For example a given bit combination could correspond to $N_E=6$ if $N_P=6$. At the same time, the same bit combination could correspond to say $N_E=100$ if $N_P=100$. Hence, by utilizing the 3 bits in the MIB used for encoding the number of primary RBs, this may be an even more efficient way of encoding than joint encoding.

For carrier aggregation in LTE-Advanced, use of component carriers wider than those defined for LTE preferably makes useful all the entries in Table 3 indicated as N/A. Table 4 (another representation) exemplifies how a 3-bit word could encode different configurations depending on the value of $N_P$. We could also use other representations with other alphabets, orderings or information entities. Thus, in total 6 bits are used, namely the already existing 3 bits in the MIB from LTE and 3 new bits for LTE-Advanced. This encoding results in more valid carrier configurations for LTE-Advanced, than if $N_E$ would have been encoded independently from $N_P$. In this example, the numbers ranging from 102 to 110 are listed as other possible values of $N_E(N_T)$, which are wider than the ones supported in LTE. However, they could be replaced with any new supported value not necessarily just extending a 100 RB carrier (e.g., extending a 75 RB wide carrier to 77, 79 RBs etc.). In this example, bit combination {1,1,1} always corresponds to the case where there are no dedicated LTE-Advanced RBs ($N_T=N_P$), which is depicted in the bottom of FIG. 1.

TABLE 4

| | Bit configuration | | | | | | | |
|---|---|---|---|---|---|---|---|---|
| $N_P$ | {0, 0, 0} | {0, 0, 1} | {0, 1, 0} | {0, 1, 1} | {1, 0, 0} | {1, 0, 1} | {1, 1, 0} | {1, 1, 1} |
| 6 | 104 | 102 | 100 | 75 | 50 | 25 | 15 | 6 |
| 15 | 106 | 104 | 102 | 100 | 75 | 50 | 25 | 15 |
| 25 | 108 | 106 | 104 | 102 | 100 | 75 | 50 | 25 |
| 50 | 110 | 108 | 106 | 104 | 102 | 100 | 75 | 50 |
| 75 | N/A | 110 | 108 | 106 | 104 | 102 | 100 | 75 |
| 100 | N/A | N/A | 110 | 108 | 106 | 104 | 102 | 100 |

In this example, we can see that this representation includes all the numbers of extension RBs (6, 15, 25, 50, 75, 100, 102, 104, 106, 108 and 110) for any supported number of primary RBs (6, 15, 25, 50, 75 and 100). Each entity of this representation indicates one available combination of the number of primary RBs and the number of extension RBs. Hence, the 3 bits, when combined with the 3 bits in the MIB, provides 45 eligible combinations. One encoded number of extension RBs {0,1,1} (an entity of the representation) identifies the available number of extension RBs $N_E$=100 if $N_P$=15, hence it is dependent on the number of primary RBs and the available combination is $(N_E,N_P)$=(100,15).

It is obvious for the skilled person to use different bit configuration to indicate different combination $(N_E,N_P)$.

Block 203: The encoded number of primary RBs is signaled. Preferably it is signaled through at least one primary RB. In a preferred mode of the disclosure, it is signaled on the first component carrier.

This block is similar to the signaling procedure of the number of RBs of a component carrier to a UE in the LTE.

Block 204: The encoded number of extension RBs is signaled to a UE.

Specifically, block 202 may include the following options.

A. The encoded number of extension RBs is signaled through a component carrier.

The encoded number of extension RBs may be signaled through the first component carrier or a second component carrier. It means the encoded number of extension RBs of component carrier 1 may be signaled in component carrier 2.

The option A may specifically have following example options.

1. The encoded number of extension RBs is signaled through at least one primary RB of a component carrier.

For signaling encoded number of extension RBs on primary resources, it is essential to maintain backwards compatibility for the primary system. That means, LTE UE should not need to have knowledge about the presence of the extension resource information. Specifically, a number of such signaling options exist.

1) Signaling on the MIB

The encoded number of extension RBs may be signaled through spare values or spare bits in an existing MIB or through a new MIB, in the primary RBs of a component carrier.

For example, the two spare values in the LTE MIB could be used for carrying the encoded number of extension RBs. Additionally, there are 10 spare bits in the LTE MIB that also might be used. The advantage of putting the information in the MIB is that it is possible to define a new DL-SCH for LTE-Advanced, i.e., any special SIBs for LTE-Advanced could be transmitted over a bandwidth including the extension RBs.

A special utilization of the spare values in the MIB is to indicate LTE-Advanced dedicated component carriers, i.e., carriers where there are no primary resources. This case is depicted in the middle of FIG. 1. If the first component carrier only comprises extension RBs, and where the number of primary RBs of the component carrier is 0, the encoded number of primary RBs can be signaled through spare values in an existing MIB of a component carrier.

If the LTE control signaling formats are kept also for this type of component carriers, an LTE UE could still be able to read the MIB. Hence, if the spare values in the MIB are used, an LTE UE should interpret this as the component carrier does not contain any LTE resources, and abort its access procedure. Thus it would be possible to prevent any further accessing attempts to the carrier from an LTE UEs in an early stage.

For the LTE-Advanced UE, information contained in the spare values, possibly in combination with spare bits, could indicate where to find the PDCCH so that extension RBs information could be transmitted on the DL-SCH, e.g., through a SIB.

2) Signaling on the SIB

The encoded number of extension RBs may be signaled through new fields in at least one existing SIB or through at least one new SIB in the primary RBs of a component carrier.

The contents in the existing SIBs could be extended to include some new fields to carry the encoded number of extension RBs for an LTE-Advanced UE, as an LTE UE would simply ignore such extra information. For example, SIB2 could be extended with the encoded number of extension RBs.

There are currently a large number of SIBs defined for LTE, transmitted with different periodicity. An example embodiment provides a completely new SIB, to be transmitted on the LTE DL-SCH, which is read by LTE-Advanced UEs.

3) Signaling on Empty Control Channel Elements

The PDCCH is transmitted on sets of subcarriers, referred to as control channel elements (CCEs), which are interleaved over the primary system bandwidth. The usage of the CCEs depends on the scheduled number of UEs and there may thus be unused CCEs, which could be utilized for transmitting other information, e.g., the encoded number of extension RBs to LTE-Advanced UEs. LTE UEs would not be able to decode such information while it would be possible for LTE-Advanced UEs to retrieve the information.

4) Signaling on Unused Physical Control Format Indicator Channel (PCFICH) State

The length of the control region where the PDCCH is transmitted is in LTE configurable to be 1, 2 or 3 OFDM symbols, which is signaled by two bits in the PCFICH. The spare value can thus be used to carry information about the encoded number of extension RBs. For backwards compatibility in this case, LTE UEs should assume that the control region is P symbols if the spare field is used, where P is either fixed or semi-statically configured by higher layers. If there is only one number of extension RBs associated with each number of primary RBs, the single state in PCFICH would be sufficient to communicate the number of extension RBs to the LTE-Advanced UEs.

5) Signaling on PDSCH Resources

The information of number of extension RBs could be transmitted in reserved PDSCH resources. For other transmissions, either some special form of rate matching could be used around the reserved elements. Alternatively, no special encoding is done and the UE would simply take these elements into account in its decoding process. For instance, either trying to decode them as data if their presence is unknown, or regarding them as erasures if their presence is known.

6) Signaling on Dedicated Radio Resource Control (RRC) Signaling

Since the base station (eNodeB) can determine whether the UE is capable of LTE-Advanced transmission, it can establish UE dedicated RRC signaling, on the primary resources. Such signaling may thus include the encoded number of extension RBs.

2. The encoded number of extension RBs is signaled through at least one extension RB of a component carrier.

The number of extension RBs could be signaled on the extension resources, which would not affect the transmissions on the primary resources. For signaling on the extension resources, the UE may have to rely on different forms of hypothesis testing and blind detection, since the amount of extension resources is unknown and there may be component carriers only having primary RBs and no extension RBs. The signaling on extension resources is facilitated in numerous example alternatives.

1) Signaling on Reference Signals

The base station transmits common reference signals on the downlink to be used for channel estimation and measurements. If there are reference symbols on the extension resources, the possible locations of these can be assumed known to the UE. Hence a UE can blindly detect the number of extension RBs by energy detection on the reference signals and perform hypothesis testing.

2) Signaling on Special Radio Signals

Different bandwidth configurations can be signaled by transmission of a signal generated from a set of sequences, where each sequence encodes one bandwidth configuration. The UE can correlate a received signal with the set of sequences to determine the transmitted sequence, i.e., obtain the number of extension resources. Since the primary bandwidth is known to the UE, the possible location of the time-frequency resources used for transmitting such sequences could be determined implicitly from the value of the primary bandwidth. Hypothesis testing is then needed to determine if the signal is present.

3) Signaling on Control Channels

The encoded number of extension RBs could be encoded (e.g., by convolutional encoder), modulated and transmitted on the extension resources as a new control channel for the secondary transmission scheme. As mentioned previously, the location of the time-frequency resources could be determined implicitly from the value of the primary bandwidth. Hypothesis testing is then needed to determine if the channel is present.

B. The encoded number of extension RBs is signaled through at least one sub-carrier located between two component carriers.

In case of carrier aggregation, there could be a number of unmodulated subcarriers being located between two component carriers. In some cases, such subcarriers could be modulated to carry the encoded number of extension RBs.

These subcarriers may be regarded as not being part of any component carrier or RB but could be utilized for the special purpose of signaling information to LTE-Advanced UEs. Alternatively they could be regarded as a special-sized RB for LTE-Advanced UEs, possibly belonging to a component carrier. In any case the above encoding methods apply to such subcarriers as well.

When several resource partitions for multiple component carriers need to be signaled, for example the first component carrier and another third component carrier, it is possible to encode and signal each resource partition of a component carrier separately using the blocks 201-204. Of course, it is also possible to signal the encoded numbers of extension RBs of the multiple component carriers through one component carrier or at least one subcarrier, and then the block 204 includes:

The encoded number of extension RBs of the first component carrier and encoded number of extension RBs of a third component carrier are signaled through the same component carrier; or The encoded number of extension RBs of the first component carrier and encoded number of extension RBs of a third component carrier are signaled through the same at least one subcarrier located between two component carriers.

The method to signal the encoded number $N_E$ is very flexible. The above signaling method may be combined. For instance, there are three component carriers 1, 2 and 3. The encoded number of extension RBs of the component carrier 1, $N_{E1}$, can be signaled through its primary RBs or extension RBs. The encoded number of extension RBs of the component carrier 2, $N_{E2}$, can be signaled through the primary RBs or extension RBs of the component carrier 3. The encoded number of extension RBs of the component carrier 3, $N_{E3}$, can be signaled through at least one subcarrier located between the component carrier 1 and the component carrier 2. The encoded values $N_{E1}$ and $N_{E2}$ can be signaled through at least one primary RB or extension RB of component carrier 3. The encoded values $N_{E1}$ and $N_{E3}$ can be signaled through at least one subcarrier located between component carrier 1 and component carrier 2.

The extension resources on the component carrier may typically be located symmetrically around the primary resources. It would then suffice to signal a value $N_E$ determining the component carrier resource partition. If the extension RBs of the first component carrier are located asymmetrically around the primary RBs, the method according to this embodiment may further include the following blocks.

Block 205: Additional information on the location of extension RBs of the first component carrier is encoded.

The additional information may be a bitmap which is used to indicate the location of the extension RBs of a component carrier. It may be encoded in conjunction with $N_E$.

Block 206: The encoded additional information on the location of extension RBs of the first component carrier is signaled to the UE.

The signaling method is similar to the above blocks about how to signaling the encoded value $N_E$. The encoded additional information may be signaled in conjunction with encoded value $N_E$.

Instead of Block 205 and 206 the base station (eNodeB) and UE may also use some predefined rules to determine the location of the extension RBs of the first component carrier.

The number of extension RBs of the first component carrier, $N_E$, may be indirectly represented by the total number of RBs of the first component carrier, $N_T$, or directly represented by the actual number of extension RBs of the first component carrier, $N_E^{actual}$.

The order of the blocks according to this embodiment is also very flexible besides the block 203 has to follow the block 201, the block 204 has to follow the block 202 and block 206 has to follow the block 205.

According to the embodiment of the present disclosure a base station can communicate a resource partition of a component carrier to a UE via encoding and signaling the number of extension RBs of the component carrier. The number of extension RBs of the component carrier can be encoded according to a representation comprising the number of extension RBs for any supported number of primary RBs. The encoded number of extension RBs of the component carrier can be signaled through a component carrier or subcarriers. Multiple encoded numbers of extension RBs of multiple component carriers can be signaled through the same component carrier or subcarrier. When the component carrier only comprises extension RBs the encoded number of primary RBs of the component carrier can be signaled through spare values or spare bits in an existing MIB of a component carrier. When the extension RBs of the component carrier are located asymmetrically around the primary RBs the UE can get the location of the extension RBs via additional information or predefined rules.

Figure 3:
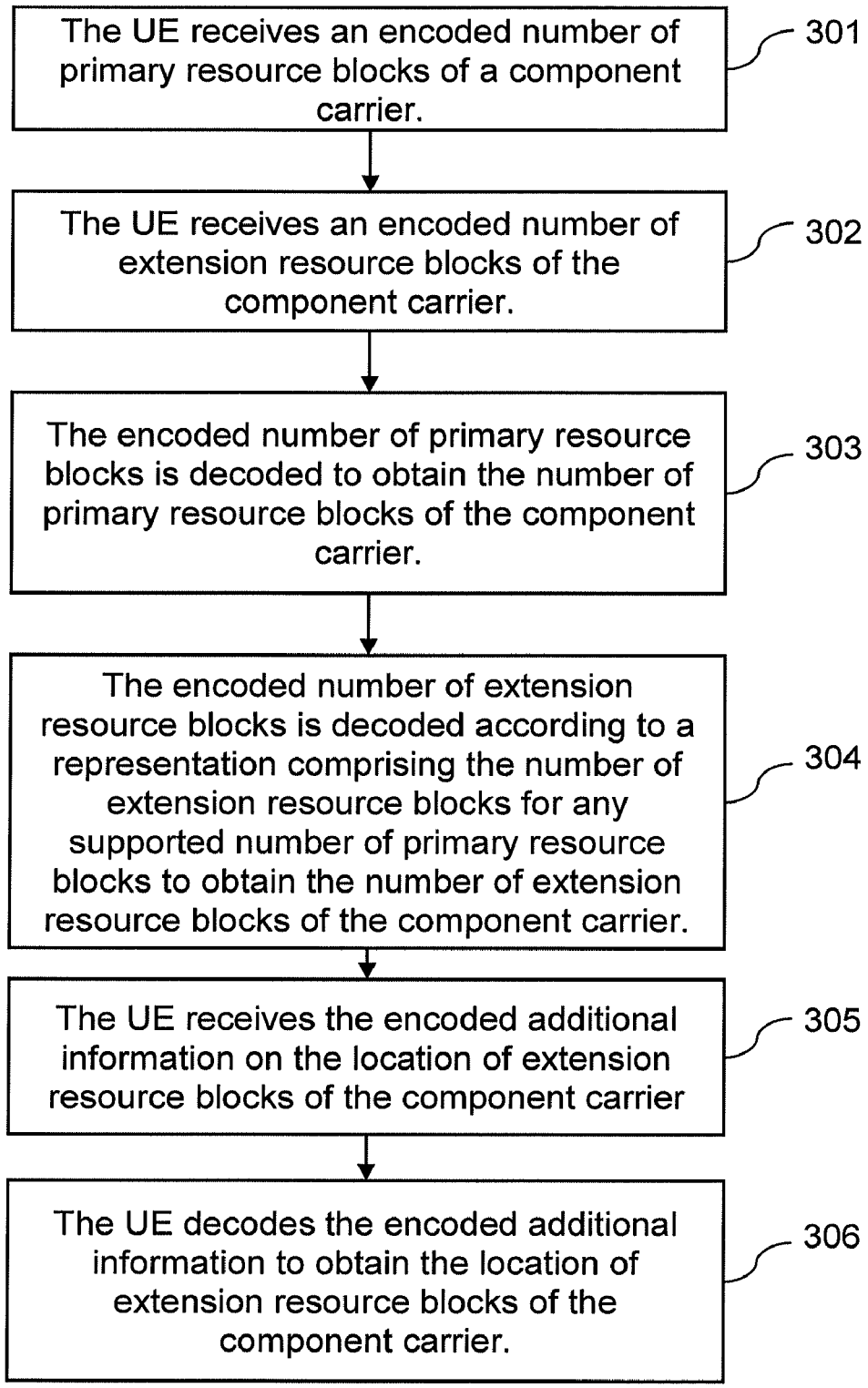
FIG. 3 is a block diagram of one embodiment of the present disclosure.

One embodiment of the present disclosure will now be described with reference to FIG. 3 showing a method for a UE to receive resource partition of at least one component carrier in a wireless communication system. The UE may be a LTE-Advanced UE.

Block 301: The UE receives an encoded number of primary RBs of a component carrier.

The UE may receive the encoded number of primary RBs from the primary RB of the component carrier. This is similar to the procedure in the LTE.

Block 302: The UE receives an encoded number of extension RBs of the component carrier.

Where the UE receives the encoded number of extension RBs depends on which signaling option in block 204 is adopted by the base station. For example, if the encoded number of extension RBs of component carrier 1 is signaled to the UE through the primary RBs or of component carrier 2, the UE receive the encoded number of extension RBs of the component carrier 1 from the primary RBs of the component carrier 2.

Block 303: The encoded number of primary RBs is decoded to obtain the number of primary RBs of the component carrier.

The UE can decode the encoded number of primary RBs to obtain the value of $N_P$ of the component carrier. This block is similar to the decoding procedure of the number of RBs of a component carrier in the LTE. A special case is the encoded number of primary RBs received from spare values in an existing MIB of a component carrier indicates the component carrier only comprises extension RBs, and where the number of primary RBs of the component carrier is 0. Hence, the UE can know that the component carrier only comprises extension RBs.

Block 304: The encoded number of extension RBs is decoded according to a representation comprising the number of extension RBs for any supported number of primary RBs to obtain the number of extension RBs of the component carrier.

Specifically, this block includes following options corresponding to which option in block 202 is adopted by the base station (eNodeB).

A. The UE directly decodes the encoded number of extension RBs according to a representation comprising the number of extension RBs for any supported number of primary RBs to obtain the number of extension RBs of the component carrier.

If the base station uses the first option in block 202 to encode the number of extension RBs, $N_E$, the UE can obtain $N_E$ of the component carrier by directly decoding the encoded number of extension RBs according to the representation in the first option in block 202. For example, if the UE receives the encoded number of extension RBs {0,1,0}, it can decode {0,1,0} to $N_E$=100 which corresponds to the entity {0,1,0} in the Table 2.

If the base station uses the second option in block 202 to encode the number of extension RBs, $N_E$, the UE can obtain $N_E$ of the component carrier by directly decoding the encoded number of extension RBs according to the representation in the second option in block 202. For example, if the UE receives the encoded number of extension RBs {0,1,0,0,0}, it can decode {0,1,0,0,0} to ($N_E$=50, $N_P$=15) which corresponds to the entity {0,1,0,0,0} in the Table 3. In this case, in fact the 3 bits for signaling the number of primary RBs are not necessarily utilized and essentially 5 new bits in this example need to be signaled to the LTE-Advanced UE.

B. The UE decodes the encoded number of extension RBs dependently on the number of primary RBs of the component carrier to obtain the number of extension RBs of the component carrier according to a representation comprising the number of extension RBs for any supported number of primary RBs to obtain the number of extension RBs of the component carrier.

If the base station uses the third option in block 202 to encode the number of extension RBs, $N_E$, the UE has to know the number of primary RBs firstly (If the $N_P$ in the representation of the third option in block 202 is represented by the encoded number, here the UE have to know the encoded number of primary RBs). Then it can obtain the $N_E$ of the component carrier by decoding the encoded number of extension RBs according to the representation in the second option in block 202. For example, if the decoded number of primary RBs is $N_P$=75 and the UE receives the encoded number of extension RBs {0,1,0}, it can decode {0,1,0} to $N_E$=108 which corresponds to the entity {0,1,0} in the Table 4.

If the UE receives several encoded numbers of extension RBs of multiple component carriers from the same component carrier or subcarrier, it just decodes them separately and can obtain several numbers of extension RBs of multiple component carriers.

If the extension RBs of the component carrier are located asymmetrically around the primary RBs, the method according to this embodiment may further include the following blocks.

Block 305: The UE receives the encoded additional information on the location of extension RBs of the component carrier.

The additional information may be encoded in conjunction with encoded number of extension RBs.

Block 306: The UE decodes the encoded additional information to obtain the location of extension RBs of the component carrier.

The additional information may be a bitmap which is used to indicate the location of the extension RBs of a component carrier.

Instead of Block 305 and 306 the UE may also use some predefined rules (the same predefined rules used in the base station (eNodeB)) to determine the location of the extension RBs of the component carrier.

The number of extension RBs of the component carrier $N_E$ may be indirectly represented by the total number of RBs of the component carrier $N_T$ or directly represented by the actual number of extension RBs of the component carrier $N_E^{actual}$.

The order of the blocks according to this embodiment is also very flexible besides the block 303 has to follow the block 301, the block 304 has to follow the block 302 and block 306 has to follow the block 305.

According to the embodiment of the present disclosure, a UE can obtain a resource partition of a component carrier via receiving and decoding the number of extension RBs of the component carrier. The encoded number of extension RBs of the component carrier can be received from a component carrier or subcarriers. Multiple encoded numbers of extension RBs of multiple component carriers can be received from the same component carrier or subcarrier. The encoded number of extension RBs of the component carrier can be decoded according to a representation comprising the number of extension RBs for any supported number of primary RBs. When the component carrier only comprises extension RBs the encoded number of primary RBs can be signaled through from spare values or spare bits in an existing MIB of a component carrier. When the extension RBs of the component carrier are located asymmetrically around the primary RBs the UE can obtain the location of the extension RBs via additional information or predefined rules.

One embodiment of the present disclosure will now be described to show a data structure which comprises resource partition information of a component carrier in a wireless communication system. This data structure includes at least one entity which indicates an available number of extension RBs of the component carrier for a supported number of primary RBs.

Specifically, this data structure may include some options corresponding to the representations in the block 202.

A. The data structure as shown in Table 2 includes at least one entity which is encoded independently of the number of primary RBs of the component carrier.

B. The data structure as shown in Table 3 includes at least one entity which indicates one available combination of the number of primary RBs and the number of extension RBs. The entity is encoded jointly with the number of primary RBs of the component carrier.

C. The data structure as shown in Table 3 includes at least one entity which indicates one available combination of the number of primary RBs and the number of extension RBs. The entity is encoded dependently on the number of primary RBs of the component carrier.

According to the embodiment of the present disclosure, the data structure makes it possible to encode the number of extension RBs of a component carrier. So a resource partition of the component carrier can be communicated between a base station and a UE.

Figure 4:
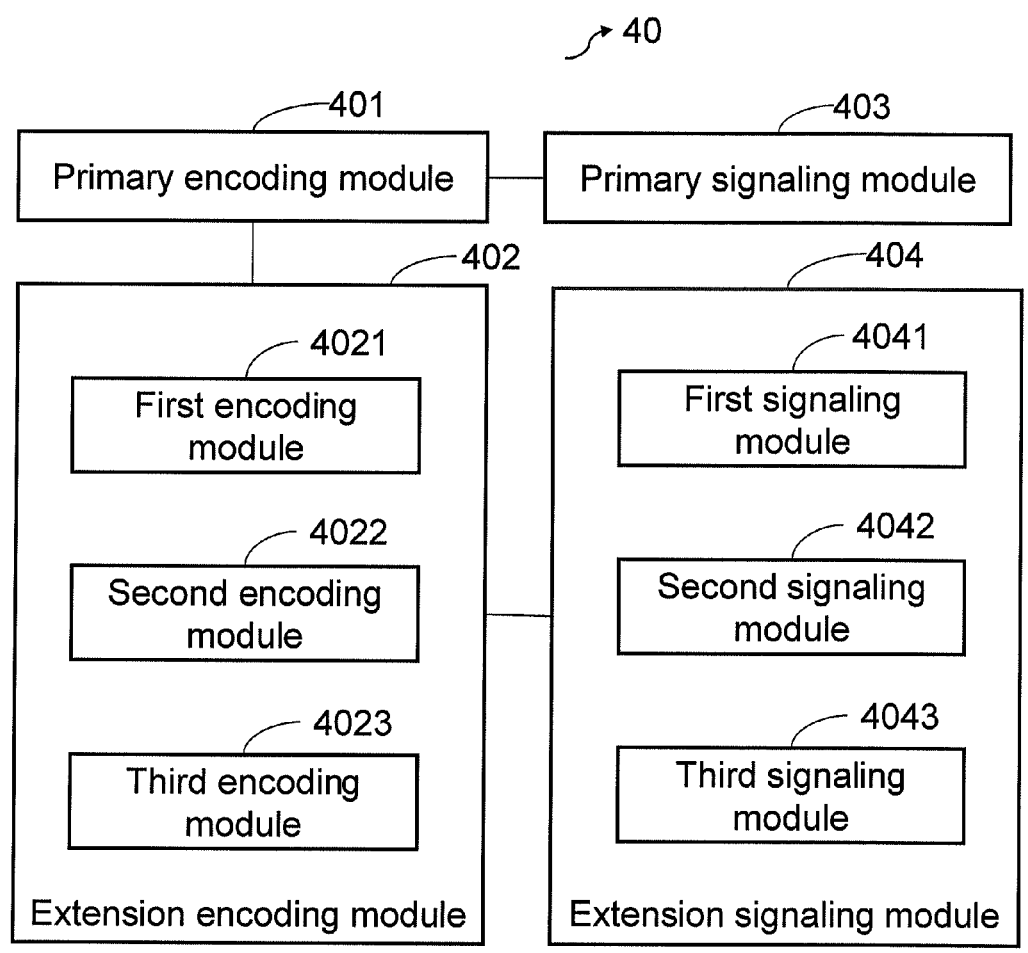
FIG. 4 is an architecture diagram of an apparatus according to one embodiment of the present disclosure.

One embodiment of the present disclosure will now be described with reference to FIG. 4 showing an apparatus 40 for signaling resource partition of at least one component carrier to a UE in a wireless communication system. This apparatus 40 may function in a transmitter, base station. Specifically, this apparatus 40 includes a primary encoding module 401, an extension encoding module 402, a primary signaling module 403 and an extension signaling module 404. Even if various modules are illustrated in disjoint blocks or boxes of the drawing, this does not exclude that the modules, e.g. primary encoding module and extension encoding module, have common parts or circuitry.

The primary encoding module 401 is configured to encode the number of primary RBs of a component carrier.

The extension encoding module 402 is configured to encode number of extension RBs of the component carrier according to a representation comprising the number of extension RBs for any supported number of primary RBs. The encoded number of extension RBs identifies for the number of primary RBs the available number of extension RBs.

The primary signaling module 403 is configured to signal the encoded number of primary RBs through at least one primary RB of the component carrier; and The extension signaling module 404 is configured to signal said encoded number of extension RBs.

The extension encoding module 402 may include a first encoding module 4021, a second encoding module 4022 and a third encoding module 4023.

The first encoding module 4021 is configured to encode the number of extension RBs with an encoding method being independent of the number of primary RBs of the component carrier according to a representation comprising the number of extension RBs for any supported number of primary RBs.

The second encoding module 4022 is configured to encode the number of extension RBs and the number of primary RBs of the component carrier with a joint encoding method according to a representation comprising the number of extension RBs for any supported number of primary RBs.

The third encoding module 4023 is configured to encode the number of extension RBs with an encoding method being dependent on the number of primary RBs of the component carrier according to a representation comprising the number of extension RBs for any supported number of primary RBs.

The extension signaling module 404 may include a first signaling module 4041, a second signaling module 4042 and a third signaling module 4043.

The first signaling module 4041 is configured to signal the encoded number of extension RBs through at least one primary RB of a component carrier. Of course, the component carrier which carries the encoded number of extension RBs of a component carrier 1 may be the component carrier 1 or other component carrier, i.e. component carrier 2.

The second signaling module 4042 is configured to signal the encoded number of extension RBs through at least one extension RB of a component carrier. Similarly, the component carrier which carries the encoded number of extension RBs of a component carrier 1 may be the component carrier 1 or other component carrier, i.e. component carrier 2.

The third signaling module 4043 is configured to signal the encoded number of extension RBs through at least one subcarrier located between two component carriers.

The extension signaling module 404 may further include a multiple of signaling modules not shown in FIG. 4. The multiple signaling modules are configured to signal the encoded numbers of extension RBs of multiple component carriers through the same component carrier or the same at least one subcarrier located between two component carriers.

The apparatus 40 may further include a third encoding module and a third signaling module which are not shown in FIG. 4.

The third encoding module is configured to encode additional information on the location of extension RBs of the component carrier.

The third signaling module is configured to signaling the encoded additional information on the location of extension RBs of the component carrier.

The number of extension RBs of the component carrier may be indirectly represented by the total number of RBs of the component carrier or directly represented by the actual number of extension RBs of the component carrier.

The above described apparatus 40 according to the embodiment of the disclosure can be adapted to perform any of the steps of the method for signaling resource partition of at least one component carrier according to the embodiment of the disclosure.

According to the embodiment of the present disclosure, the apparatus 40 can communicate a resource partition of a component carrier to a UE via encoding and signaling the number of extension RBs of the component carrier. The number of extension RBs of the component carrier can be encoded according to a representation comprising the number of extension RBs for any supported number of primary RBs. The encoded number of extension RBs of the component carrier can be signaled through a component carrier or subcarriers. Multiple encoded numbers of extension RBs of multiple component carriers can be signaled through the same component carrier or subcarrier. When the extension RBs of the component carrier are located asymmetrically around the primary RBs the location of the extension RBs will also be encoded and signaled.

Figure 5:
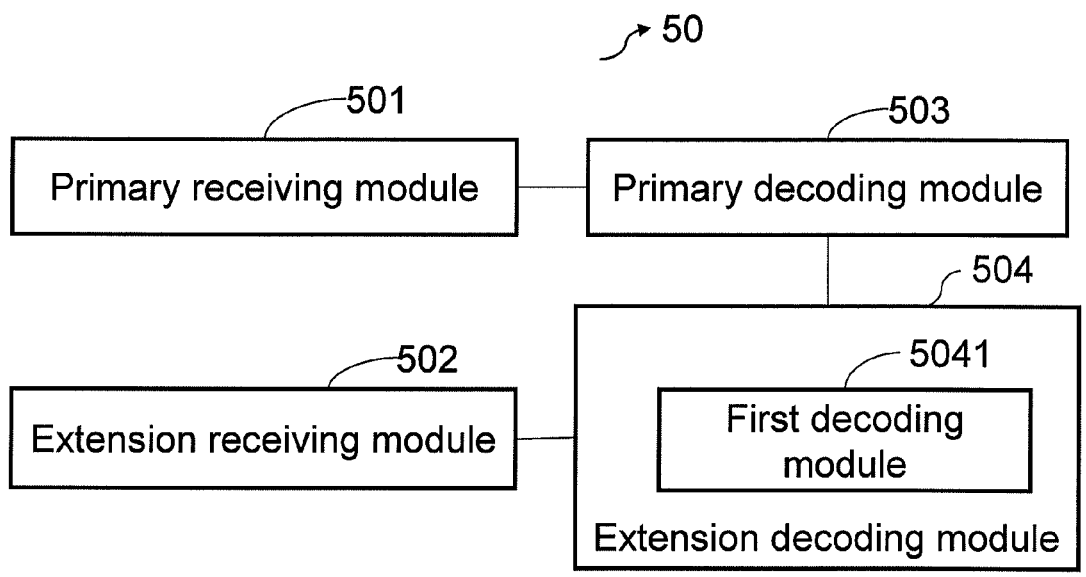
FIG. 5 is an architecture diagram of a UE according to one embodiment of the present disclosure.

One embodiment of the present disclosure will now be described with reference to FIG. 5 showing a UE 50 for receiving resource partition of at least one component carrier in a wireless communication system. This UE 50 may be a LTE-Advanced UE. Specifically, this UE 50 includes a primary receiving module 501, an extension receiving module 502, a primary decoding module 503 and an extension decoding module 504. Even if various modules are illustrated in disjoint blocks or boxes of the drawing, this does not exclude that the modules, e.g. primary decoding module and extension decoding module, have common parts or circuitry.

The primary receiving module 501 is configured to receive an encoded number of primary RBs of a component carrier.

The extension receiving module 502 is configured to receive an encoded number of extension RBs of the component carrier. The extension receiving module 502 may receive the encoded number of extension RBs of component carrier 1 from the component carrier 1 or other component carrier. The extension receiving module 502 may also receive the encoded number of extension RBs of the component carrier from a subcarrier located between two component carriers. For the situation of multiple encoded numbers of extension RBs of multiple component carriers, the extension receiving module 502 may receive several encoded numbers of extension RBs of multiple component carriers from the same component carrier or subcarrier.

The primary decoding module 503 is configured to decode the encoded number of primary RBs to obtain the number of primary RBs of the component carrier.

The extension decoding module 504 is configured to decode the encoded number of extension RBs according to a representation comprising the number of extension RBs for any supported number of primary RBs to obtain the number of extension RBs of the component carrier.

The extension decoding module 504 may include a first decoding module 5041 which is configured to decode the encoded number of extension RBs dependently on the number of primary RBs of the component carrier according to a representation comprising the number of extension RBs for any supported number of primary RBs to obtain the number of extension RBs of the component carrier.

The extension decoding module 504 may further include a second decoding module which is not shown in FIG. 5. The second decoding module is configured to directly decode the encoded number of extension RBs according to a representation comprising the number of extension RBs for any supported number of primary RBs to obtain the number of extension RBs of the component carrier.

If the extension receiving module 502 receives several encoded numbers of extension RBs of multiple component carriers from the same component carrier or subcarrier, the extension decoding module 504 just decodes them separately and obtains several numbers of extension RBs of multiple component carriers.

If the extension RBs of the component carrier are located asymmetrically around the primary RBs, the UE 50 may further include a third receiving module and a third decoding module which is not shown in FIG. 5.

The third receiving module is configured to receive the encoded additional information on the location of extension RBs of the component carrier.

The third decoding module is configured to decode the encoded additional information to obtain the location of extension RBs of the component carrier.

The number of extension RBs of the component carrier may be indirectly represented by the total number of RBs of the component carrier or directly represented by the actual number of extension RBs of the component carrier.

The above described UE 50 according to the embodiment of the disclosure can be adapted to perform any of the steps of the method for receiving resource partition of at least one component carrier according to the embodiment of the disclosure.

According to the embodiment of the present disclosure we can see the UE 50 can obtain a resource partition of a component carrier via receiving and decoding the number of extension RBs of the component carrier. The encoded number of extension RBs of the component carrier can be received from a component carrier or subcarrier. Multiple encoded numbers of extension RBs of multiple component carriers can be received from the same component carrier or subcarrier. The encoded number of extension RBs of the component carrier can be decoded according to a representation comprising the number of extension RBs for any supported number of primary RBs. When the extension RBs of the component carrier are located asymmetrically around the primary RBs the UE can get the location of the extension RBs via additional information.

Figure 6:
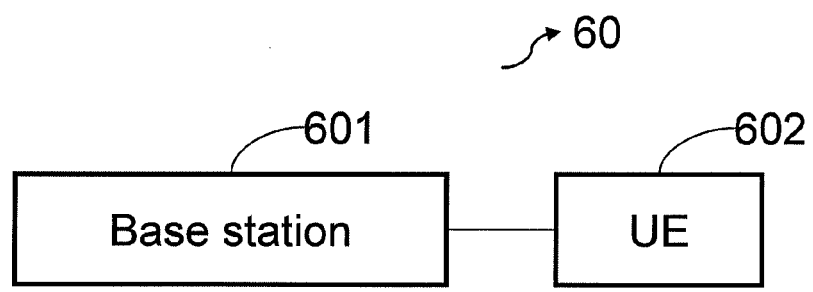
FIG. 6 illustrates an architecture diagram of a system according to one embodiment of the present disclosure.

One embodiment of the present disclosure will now be described with reference to FIG. 6 showing a system 60 for signaling resource partition of at least one component carrier in a wireless communication system. Specifically, the system 60 includes a base station 601 and the UE 602.

The base station 601 is configured to encode the number of primary RBs of a component carrier; encode the number of extension RBs of the component carrier according to a representation comprising the number of extension RBs for any supported number of primary RBs, wherein the encoded number of extension RBs identifies for the number of primary RBs the available number of extension RBs; signal the encoded number of primary RBs through at least one primary RB of the component carrier; and signaling the encoded number of extension RBs.

The UE 602 is configured to receive the encoded number of primary RBs of the component carrier; receive the encoded number of extension RBs of the component carrier; decode the encoded number of primary RBs to get the number of primary RBs of the component carrier; and decode the encoded number of extension RBs according to a representation comprising the number of extension RBs for any supported number of primary RBs to get the number of extension RBs of the component carrier.

The base station 601 may be the apparatus 40. The UE 602 may have the same structure as the UE 50.

The number of extension RBs of the component carrier may be indirectly represented by the total number of RBs of the component carrier or directly represented by the actual number of extension RBs of the component carrier.

The above described base station 601 according to the embodiment of the disclosure can be adapted to perform any of the steps of the method for signaling resource partition of at least one component carrier according to the embodiment of the disclosure. The above described UE 602 according to the embodiment of the disclosure can be adapted to perform any of the steps of the method for receiving resource partition of at least one component carrier according to the embodiment of the disclosure.

According to the embodiment of the present disclosure we can see in the system 60 the base station 601 can communicate a resource partition of a component carrier to the UE 602 via encoding and signaling the number of extension RBs of the component carrier. The number of extension RBs of the component carrier can be encoded according to a representation comprising the number of extension RBs for any supported number of primary RBs.

Some detailed embodiments are given to make the present disclosure more clear.

Figure 7:
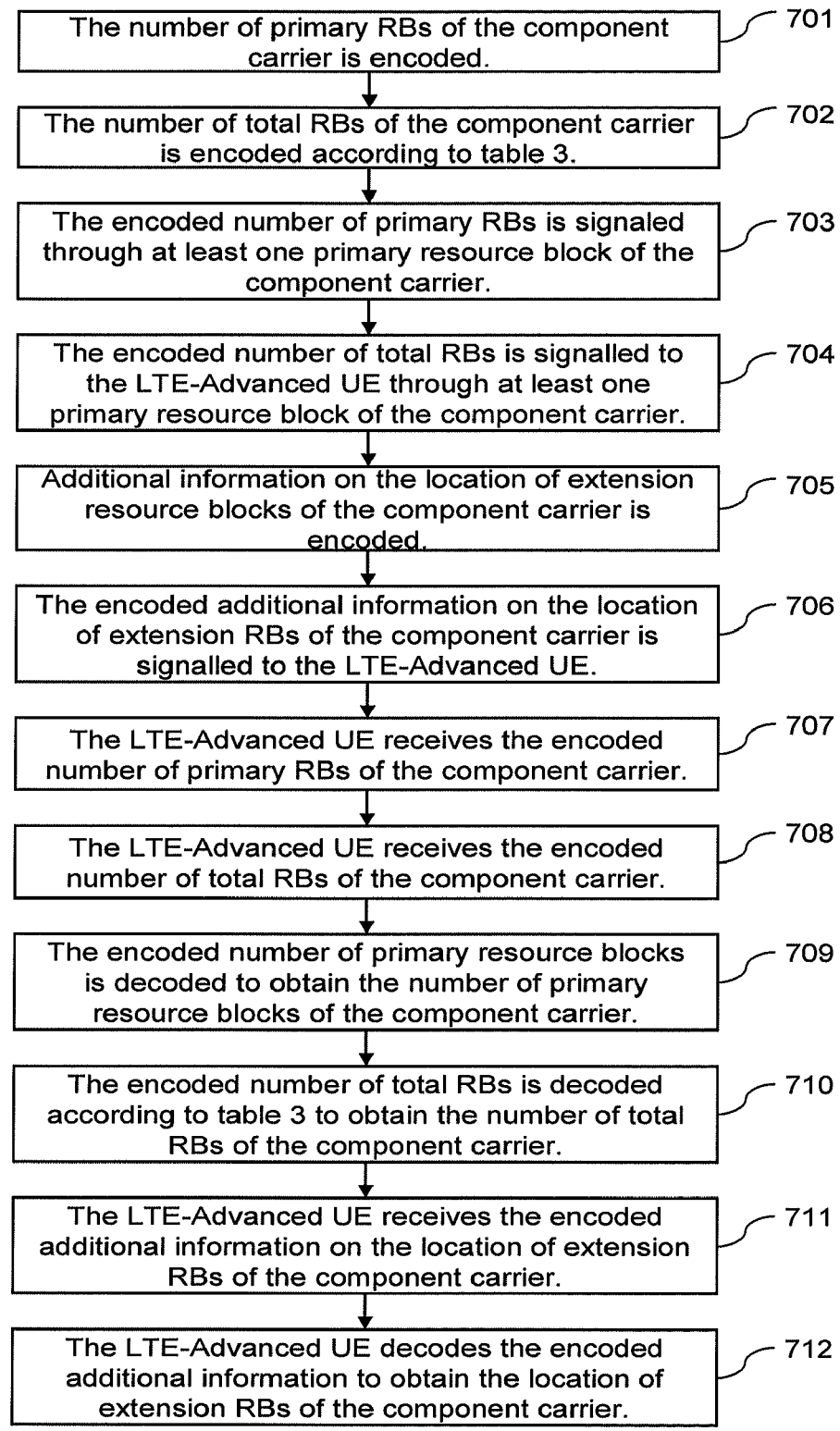
FIG. 7 is a block diagram of one detailed embodiment of the present disclosure.
Figure 8:
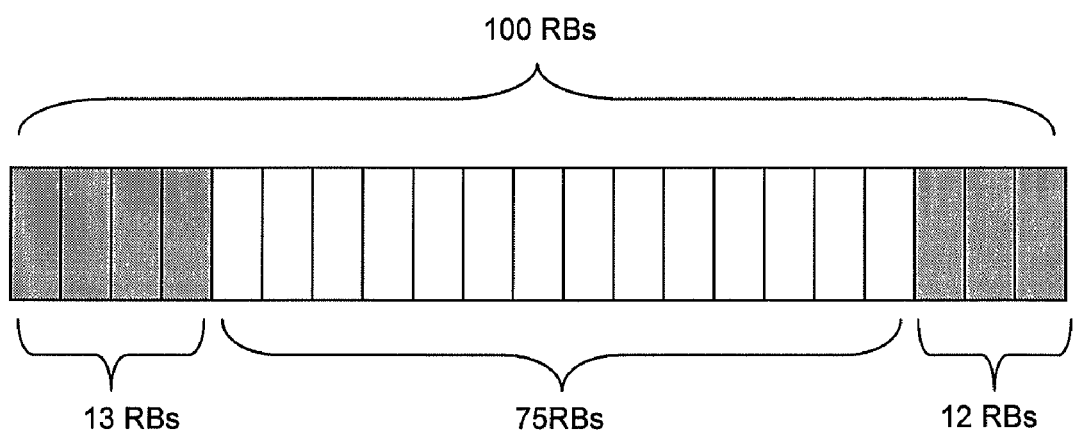
FIG. 8 is a schematic diagram of a component carrier structure according to one detailed embodiment of the present disclosure.

One detailed embodiment of the present disclosure will now be described with reference to FIG. 7. It is assumed that a component carrier including total 100 RBs will be transmitted to an LTE-Advanced UE. The number of primary RBs of the component carrier $N_P$ is 75. The structure of this component carrier is illustrated in FIG. 8 where there are 13 extension RBs to the left of the primary RBs and 12 extension RBs to the right of the primary RBs. The representation in this detailed embodiment is the second option in block 202, i.e. the Table 3 is used in the encoding procedure and decoding procedure. As show in FIG. 7, the method for this detailed embodiment includes following blocks.

Block 701: The number of primary RBs of the component carrier ($N_P$=75) is encoded.

Block 702: The number of total RBs of the component carrier ($N_T$=100) is encoded according to Table 3.

Since the $N_P$=75 and $N_T$=100, the encoded number of total RBs of the component carrier is {1,0,0,1,1}.

Block 703: The encoded number of primary RBs is signaled through at least one primary RB of the component carrier.

Block 704: The encoded number of total RBs {1,0,0,1,1} is signaled to the LTE-Advanced UE through at least one primary RB of the component carrier.

Here, the encoded number of total RBs {1,0,0,1,1} is signaled through new fields in the existing SIB.

Because the extension RBs of the component carrier are located asymmetrically around the primary RBs, the method according to this detailed embodiment may further include the following blocks.

Block 705: Additional information on the location of extension RBs of the component carrier is encoded.

A bitmap representation, which can indicate there are 13 extension RBs to the left of the primary RBs and 12 extension RBs to the right of the primary RBs may be encoded in conjunction with $N^P$.

Block 706: The encoded additional information on the location of extension RBs of the component carrier is signaled to the LTE-Advanced UE.

Block 707: The LTE-Advanced UE receives the encoded number of primary RBs of the component carrier.

Block 708: The LTE-Advanced UE receives the encoded number of total RBs of the component carrier, i.e. {1,0,0,1,1}.

The LTE-Advanced UE receives the encoded number of total RBs of the component carrier from new fields in an existing SIB in primary RB of the component carrier.

Block 709: The encoded number of primary RBs is decoded to obtain the number of primary RBs of the component carrier ($N_P$=75).

Block 710: The encoded number of total RBs is decoded according to Table 3 to obtain the number of total RBs of the component carrier ($N_T$=100).

In fact, the LTE-Advanced UE can decode {1,0,0,1,1} directly according to Table 3 to ($N_T$=100, $N_P$=75). In this case, the blocks 701, 703, 707 and 709 are not necessarily needed to the LTE-Advanced UE in this detailed embodiment.

Because the extension RBs of the component carrier are located asymmetrically around the primary RBs, the method according to this detailed embodiment may further include the following blocks.

Block 711: The LTE-Advanced UE receives the encoded additional information on the location of extension RBs of the component carrier.

Block 712: The LTE-Advanced UE decodes the encoded additional information to obtain the location of extension RBs of the component carrier.

The LTE-Advanced UE decodes the bitmap and obtains there are 13 extension RBs to the left of the primary RBs and 12 extension RBs to the right of the primary RBs.

According to the detailed embodiment of the present disclosure, the LTE-Advanced UE can determine the $N_T$=100,
$N_P$=75, also the $N_E^{actual}$=25 according to $N_T$=$N_P$+$N_E^{actual}$. The location of the extension RBs which is 13 extension RBs to the left of the primary RBs and 12 extension RBs to the right of the primary RBs is also realized. So the resource partition of the component carrier is obtained by the LTE-Advanced UE.

Figure 9:
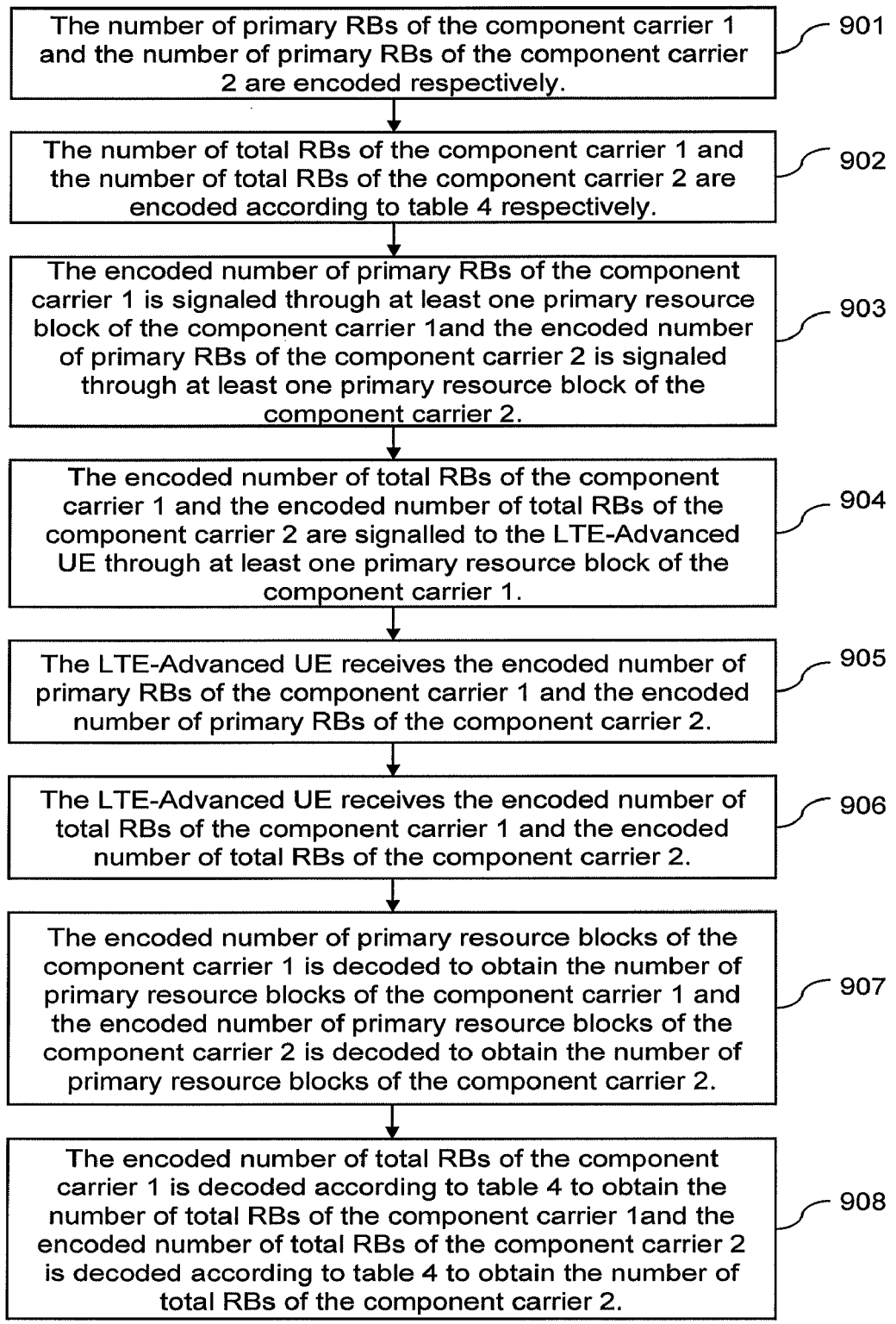
FIG. 9 is a block diagram of another detailed embodiment of the present disclosure.
Figure 10:
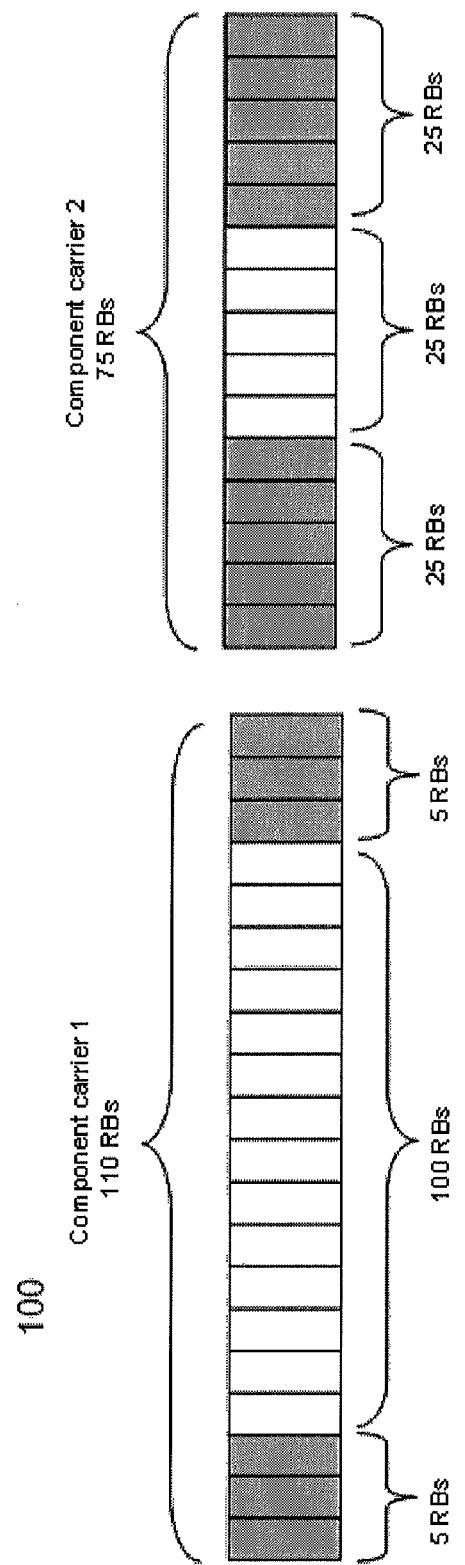
FIG. 10 is a schematic diagram of two component carriers' structure according to another detailed embodiment of the present disclosure.

One detailed embodiment of the present disclosure will now be described with reference to FIG. 9. It is assumed that component carrier 1 including total 110 RBs ($N_{T1}$=110) and component carrier 2 including total 75 RBs ($N_{T2}$=75) will be transmitted to an LTE-Advanced UE. The number of primary RBs of the component carrier 1 is 100 ($N_{P1}$=100). The number of primary RBs of the component carrier 2 is 100 ($N_{P2}$=25). The structure of the two component carriers is illustrated in FIG. 10 where extension RBs of the component carrier 1 are located symmetrically around primary RBs of the component carrier 1 and the extension RBs of the component carrier 2 are also located symmetrically around the primary RBs of the component carrier 2. The representation in this detailed embodiment is the third option in block 202, i.e. the Table 4 is used in the encoding procedure and decoding procedure. As show in FIG. 9, the method for this detailed embodiment includes following blocks.

Block 901: The number of primary RBs of the component carrier 1 ($N_{P1}$=100) and the number of primary RBs of the component carrier 2 ($N_{P2}$=25) are encoded respectively.

Block 902: The number of total RBs of the component carrier 1 ($N_{T1}$=110) and the number of total RBs of the component carrier 2 ($N_{T2}$=75) are encoded according to Table 4 respectively.

Since the $N_{P1}$=100 and $N_{T1}$=110, the encoded number of total RBs of the component carrier 1 is {0,1,0}. Since the $N_{P2}$=25 and $N_{T2}$=75, the encoded number of total RBs of the component carrier 1 is {1,0,1}.

Block 903: The encoded number of primary RBs of the component carrier 1 is signaled through at least one primary RB of the component carrier land the encoded number of primary RBs of the component carrier 2 is signaled through at least one primary RB of the component carrier 2.

Block 904: The encoded number of total RBs of the component carrier 1 {0,1,0} and the encoded number of total RBs of the component carrier 2 {1,0,1} are signaled to the LTE-Advanced UE through at least one primary RB of the component carrier 1.

Here, the encoded number of total RBs of the component carrier 1 {0,1,0} and the encoded number of total RBs of the component carrier 2 {1,0,1} are signaled through a new SIB in the primary RB of the component carrier 1.

Block 905: The LTE-Advanced UE receives the encoded number of primary RBs of the component carrier 1 and the encoded number of primary RBs of the component carrier 2.

Block 906: The LTE-Advanced UE receives the encoded number of total RBs of the component carrier 1 {0,1,0} and the encoded number of total RBs of the component carrier 2 {1,0,1}.

The LTE-Advanced UE receives this information from a new SIB in primary RB of the component carrier 1.

Block 907: The encoded number of primary RBs of the component carrier 1 is decoded to obtain the number of primary RBs of the component carrier 1 ($N_{P1}$=100) and the encoded number of primary RBs of the component carrier 2 is decoded to obtain the number of primary RBs of the component carrier 2 ($N_{P2}$=25).

Block 908: The encoded number of total RBs of the component carrier 1 is decoded according to Table 4 to obtain the number of total RBs of the component carrier 1 ($N_{T1}$=110) and the encoded number of total RBs of the component carrier 2 is decoded according to Table 4 to obtain the number of total RBs of the component carrier 2 ($N_{T2}=75$).

According to the detailed embodiment of the present disclosure, the LTE-Advanced UE can determine the $N_{T1}=110$, $N_{P1}=100$, also the $N_{E1}^{actual}=25$ of the component carrier 1 according to $N_T=N_P+H_E^{actual}$. In the same way, the LTE-Advanced UE can determine the $N_{T2}=75$, $N_{P2}=25$, also the $N_E^{actual}=25$ of the component carrier 2 according to $N_T=N_P+N_E^{actual}$.

Because both the extension RBs of the component carrier 1 and the component carrier 2 are located asymmetrically around the primary RBs, it is sufficient for the LTE-Advanced UE to determine the location of the extension RBs of the component carrier 1 and the component carrier 2 via only obtaining the $N_T$ and $N_P$ of the two component carriers. The location of the extension RBs of the component carrier 1 which is 5 extension RBs to the left of the primary RBs and 5 extension RBs to the right of the primary RBs and the location of the extension RBs of the component carrier 2 which is 25 extension RBs to the left of the primary RBs and 25 extension RBs to the right of the primary RBs are also realized. So the resource partitions of the component carrier 1 and the component carrier 2 is obtained by the LTE-Advanced UE.

Figure 11:
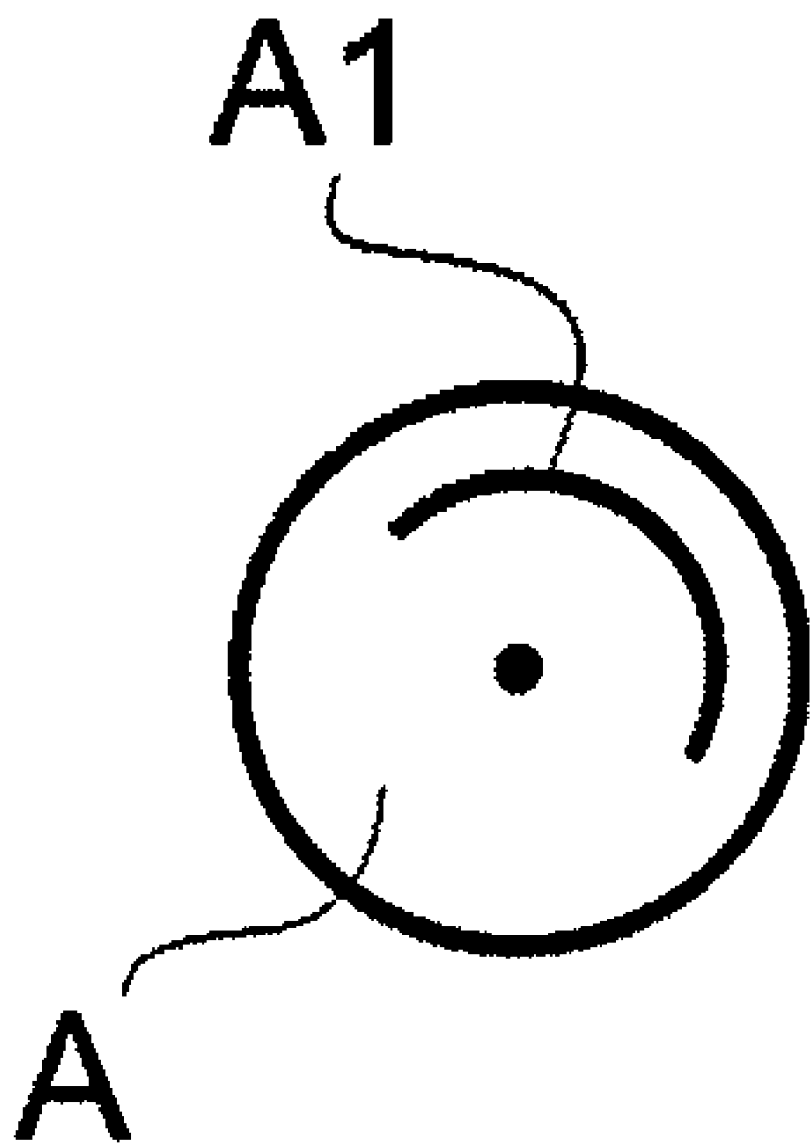
FIG. 11 is a schematic and very simplified illustration of a compact disc carrying computer program code according to the embodiment of the present disclosure.

Embodiments within the scope of the present disclosure also include a computer program product with computer program code A1, schematically shown in FIG. 11, which, when executed by a computer, will enable the computer to perform the steps of the above described inventive method. Specifically, the present disclosure relates to a computer program product with computer program code A1 which, when executed, will enable a base station or a user equipment to perform the steps of the inventive method described above. The present disclosure also relates to a computer readable medium A for carrying or having computer program code A1 according to the disclosure, such as computer-executable code, computer-executable instructions, computer-readable instructions, or data structures, stored thereon. Such computer readable medium may be any available medium, which is accessible by a general-purpose or special-purpose computer system. By way of example, and not limitation, such computer-readable medium can comprise physical storage media such as RAM, ROM, or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. FIG. 11 illustrates the computer readable medium as a compact disc.

In general, the different steps of the method of the disclosure described above can be combined or performed in any suitable order. The embodiments as well as the features of such embodiments described above can be combined if they do not exclude each other.

It will be understood that the disclosure is not restricted to the afore-described and illustrated exemplifying embodiments thereof and that modifications can be made within the scope of the inventive concept as illustrated in the accompanying Claims.

We claim:

1. A method of signaling one or more resource partitions of at least one component carrier in a wireless communication system, the method comprising:

encoding, by a transmitter in the wireless communication system, a number of primary resource blocks of a first component carrier;

encoding, by the transmitter, a number of extension resource blocks of said first component carrier according to a representation comprising the number of extension resource blocks for any supported number of primary resource blocks, wherein said encoded number of extension resource blocks determines, for the encoded number of primary resource blocks, the available number of extension resource blocks; and signaling, by the transmitter, said encoded numbers of primary and extension resource blocks of said first component carrier to a receiver in the wireless communication system;

wherein said component carrier comprises at least one of a primary resource block and an extension resource block.

2. The method according to claim 1 wherein said signaling said encoded numbers of primary and extension resource blocks is signaling through at least one resource block of a component carrier.

3. The method according to claim 1 wherein said signaling said encoded numbers of primary and extension resource blocks is signaling through at least one resource block of said first component carrier.

4. A method of signaling one or more resource partitions of at least one component carrier in a wireless communication system, the method comprising:

encoding, by a transmitter in the wireless communication system, a number of primary resource blocks of a first component carrier;

encoding, by the transmitter, a number of extension resource blocks of said first component carrier according to a representation comprising the number of extension resource blocks for any supported number of primary resource blocks, wherein said encoded number of extension resource blocks determines, for the encoded number of primary resource blocks, the available number of extension resource blocks;

signaling, by the transmitter, said encoded number of primary resource blocks through at least one primary resource block of said first component carrier to a receiver in the wireless communication system; and signaling, by the transmitter, said encoded number of extension resource blocks, wherein said component carrier comprises at least one of a primary resource block and an extension resource block.

5. The method according to claim 4, wherein encoding the number of extension resource blocks of said first component carrier comprises:

encoding the number of extension resource blocks with an encoding method being independent of the number of primary resource blocks of said first component carrier.

6. The method according to claim 4, wherein encoding the number of extension resource blocks of said first component carrier comprises:

encoding the number of extension resource blocks and the number of primary resource blocks of said first component carrier with a joint encoding method.

7. The method according to claim 4, wherein encoding the number of extension resource blocks of said first component carrier comprises:

encoding the number of extension resource blocks with an encoding method being dependent on the number of primary resource blocks of said first component carrier.

8. The method according to claim 4, wherein signaling said encoded number of extension resource blocks comprises:

signaling said encoded number of extension resource blocks through at least one primary resource block of a component carrier.

9. The method according to claim 4, wherein signaling said encoded number of extension resource blocks comprises:
  signaling said encoded number of extension resource blocks through at least one extension resource block of a component carrier.

10. The method according to claim 4, wherein signaling said encoded number of extension resource blocks comprises:
  signaling said encoded number of extension resource blocks through at least one subcarrier located between two component carriers.

11. The method according to claim 4, wherein said first component carrier only comprises extension resource blocks, and wherein the number of primary resource blocks of the component carrier is 0.

12. The method according to claim 4, wherein if said extension resource blocks of said first component carrier are located asymmetrically around said primary resource blocks of said first component carrier, the method further comprises:
  encoding additional information on the location of said extension resource blocks of said first component carrier; and
  signaling said encoded additional information on the location of said extension resource blocks.

13. A method for receiving signaling of one or more resource partitions of at least one component carrier in a wireless communication system, comprising:
  receiving, by a receiver in the wireless communication system, an encoded number of primary resource blocks of a component carrier;
  receiving, by the receiver, an encoded number of extension resource blocks of said component carrier;
  decoding, by the receiver, said encoded number of primary resource blocks to obtain the number of primary resource blocks of said component carrier; and
  decoding, by the receiver, said encoded number of extension resource blocks according to a representation comprising the number of extension resource blocks for any supported number of primary resource blocks to obtain the number of extension resource blocks of said component carrier,
  wherein said component carrier comprises at least one of a primary resource block and an extension resource block.

14. The method according to claim 13, wherein decoding said encoded number of extension resource blocks comprises:
  decoding said encoded number of extension resource blocks dependently on the number of primary resource blocks of said component carrier to obtain the number of extension resource blocks of said component carrier.

15. The method according to claim 13 wherein the number of extension resource blocks is indirectly represented by the total number of resource blocks of said component carrier or directly represented by the actual number of extension resource blocks of said component carrier.

16. An transmitter for signaling of one or more resource partitions of at least one component carrier in a wireless communication system, the transimitter comprising a processor configured to:
  encode the number of primary resource blocks of a component carrier and the number of extension resource blocks of said component carrier according to a representation comprising the number of extension resource blocks, for any supported number of primary resource blocks, wherein said encoded number of extension resource blocks determines, for the encoded number of primary resource blocks, the available number of extension resource blocks;
  signal said encoded number of primary and extension resource blocks of said component carrier,
  wherein said component carrier comprises at least one of a primary resource block and an extension resource block.

17. An transmitter for signaling one or more resource partitions of at least one component carrier in a wireless communication system, the transimitter comprising a processor configured to:
  encode the number of primary resource blocks of a component carrier;
  encode number of extension resource blocks of said component carrier according to a representation comprising the number of extension resource blocks for any supported number of primary resource blocks, wherein said encoded number of extension resource blocks determines, for the encoded number of primary resource blocks, the available number of extension resource blocks;
  signal said encoded number of primary resource blocks through at least one primary resource block of said component carrier; and
  signal said encoded number of extension resource blocks,
  wherein said component carrier comprises at least one of a primary resource block and an extension resource block.

18. A user equipment for receiving signaling of one or more resource partitions of at least one component carrier in a wireless communication system, the user equipment comprising a processor configured to:
  receive an encoded number of primary resource blocks of a component carrier;
  receive an encoded number of extension resource blocks of said component carrier;
  de code said encoded number of primary resource blocks to obtain the number of primary resource blocks of said component carrier; and
  decode said encoded number of extension resource blocks according to a representation comprising the number of extension resource blocks for any supported number of primary resource blocks to obtain the number of extension resource blocks of said component carrier,
  wherein said component carrier comprises at least one of a primary resource block and an extension resource block.

* * * * *

UNITED STATES PATENT AND TRADEMARK OFFICE
CERTIFICATE OF CORRECTION

PATENT NO. : 8,275,381 B2
APPLICATION NO. : 13/175529
DATED : September 25, 2012
INVENTOR(S) : Fredrik Berggren et al.

It is certified that error appears in the above-identified patent and that said Letters Patent is hereby corrected as shown below:

In column 28, claim 16, line 1, replace "An transmitter" with --A transmitter--.

In column 28, claim 16, line 3, after "communication system, the" replace "transimitter" with --transmitter--.

In column 28, claim 17, line 18, replace "An transmitter" with --A transmitter--.

In column 28, claim 17, line 20, after "system, the" replace "transimitter" with --transmitter--.

Signed and Sealed this
Fifth Day of February, 2013

Teresa Stanek Rea
*Acting Director of the United States Patent and Trademark Office*